United States Patent
Yang et al.

(10) Patent No.: US 10,848,999 B2
(45) Date of Patent: Nov. 24, 2020

(54) METHOD AND APPARATUS FOR REPORTING CHANNEL STATE INFORMATION

(71) Applicant: Samsung Electronics Co., Ltd., Gyeonggi-do (KR)

(72) Inventors: Yunchuan Yang, Beijing (CN); Yingyang Li, Beijing (CN); Shichang Zhang, Beijing (CN); Chengjun Sun, Beijing (CN); Jingxing Fu, Beijing (CN)

(73) Assignee: Samsung Electronics Co., Ltd (KR)

( * ) Notice: Subject to any disclaimer, the term of this patent is extended or adjusted under 35 U.S.C. 154(b) by 179 days.

(21) Appl. No.: 15/307,602

(22) PCT Filed: Apr. 27, 2015

(86) PCT No.: PCT/KR2015/004159
§ 371 (c)(1),
(2) Date: Oct. 28, 2016

(87) PCT Pub. No.: WO2015/167182
PCT Pub. Date: Nov. 5, 2015

(65) Prior Publication Data
US 2017/0048740 A1 Feb. 16, 2017

(30) Foreign Application Priority Data

Apr. 28, 2014 (CN) .......................... 2014 1 0174929

(51) Int. Cl.
*H04W 24/10* (2009.01)
*H04W 76/27* (2018.01)
(Continued)

(52) U.S. Cl.
CPC .............. *H04W 24/10* (2013.01); *H04B 7/26* (2013.01); *H04L 1/003* (2013.01); *H04L 1/0026* (2013.01);
(Continued)

(58) Field of Classification Search
CPC . H04W 24/10; H04W 76/27; H04W 72/0453; H04W 72/043; H04W 72/0413; H04W 72/10
See application file for complete search history.

(56) References Cited

U.S. PATENT DOCUMENTS

2012/0106495 A1   5/2012   Yang et al.
2012/0207047 A1   8/2012   Liao et al.
(Continued)

FOREIGN PATENT DOCUMENTS

CN   102065560   5/2011
CN   102118234   7/2011
(Continued)

OTHER PUBLICATIONS

PCT/ISA/210 Search Report issued on PCT/KR2015/004159 (pp. 3).
(Continued)

*Primary Examiner* — Anez C Ebrahim
(74) *Attorney, Agent, or Firm* — The Farrell Law Firm, P.C.

(57) ABSTRACT

The present invention discloses a method and an apparatus for reporting channel state information (CSI). In the method, a UE receives information of a CSI report, analyzes the information of the CSI report, determines a frequency band of the CSI report, a report type of the CSI report, a report mode of the CSI report, a CSI process of the CSI report, a combination of at least one in a CSI subframe set and/or cells, and a report way of the CSI report. According to the
(Continued)

method, it is ensured that in a condition that a part of uplink subframes are occupied, transmission of the CSI report of the UE is not impacted.

22 Claims, 4 Drawing Sheets

(51) Int. Cl.
| | | |
|---|---|---|
| H04B 7/26 | (2006.01) | |
| H04L 5/00 | (2006.01) | |
| H04L 1/00 | (2006.01) | |
| H04W 72/04 | (2009.01) | |
| H04W 72/10 | (2009.01) | |
| H04L 5/14 | (2006.01) | |
| H04W 88/02 | (2009.01) | |

(52) U.S. Cl.
CPC ......... *H04L 5/0057* (2013.01); *H04W 72/042* (2013.01); *H04W 72/0413* (2013.01); *H04W 72/0453* (2013.01); *H04W 72/10* (2013.01); *H04W 76/27* (2018.02); *H04L 5/14* (2013.01); *H04W 88/02* (2013.01)

(56) References Cited

U.S. PATENT DOCUMENTS

| | | | |
|---|---|---|---|
| 2013/0044624 A1 | 2/2013 | Su et al. | |
| 2013/0235756 A1* | 9/2013 | Seo ................. | H04L 1/0026 370/252 |
| 2013/0322376 A1 | 12/2013 | Marinier et al. | |
| 2013/0336214 A1 | 12/2013 | Sayana et al. | |
| 2014/0045507 A1* | 2/2014 | Bontu ................. | H04L 5/0094 455/450 |
| 2014/0105055 A1 | 4/2014 | Kang et al. | |
| 2014/0334391 A1* | 11/2014 | Khoshnevis ...... | H04W 72/0413 370/329 |

FOREIGN PATENT DOCUMENTS

| | | |
|---|---|---|
| CN | 102916785 | 2/2013 |
| CN | 103516464 | 1/2014 |
| CN | 103597766 | 2/2014 |
| EP | 2 461 504 | 6/2012 |
| EP | 2568646 | 3/2013 |
| EP | 2677671 | 12/2013 |
| WO | WO 2013184613 | 12/2013 |

OTHER PUBLICATIONS

PCT/ISA/237 Written Opinion issued on PCT/KR2015/004159 (pp. 7).

3GPP TS 36.213 V12.1.0 (Mar. 2014), Copyright 2014 3GPP Organizational Partners (ARIB, ATIS, CCSA, ETSI, TTA, TTC), pp. 187.

Chinese Office Action dated Feb. 19, 2019 issued in counterpart application No. 201410174929.6, 28 pages.

* cited by examiner

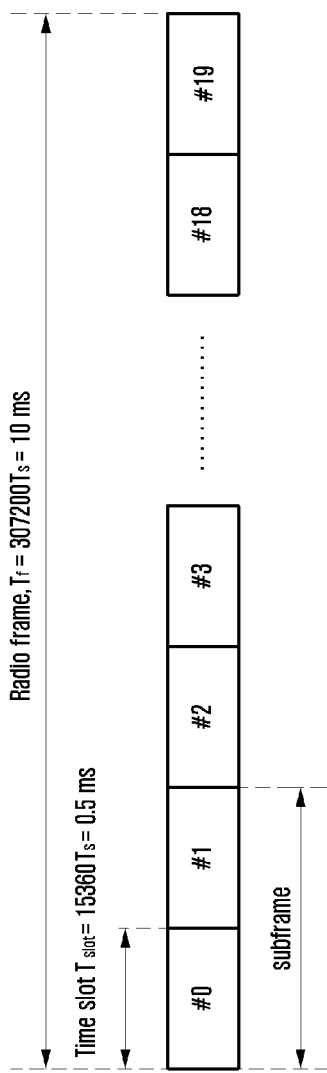
[Fig. 1]

[Fig. 2]
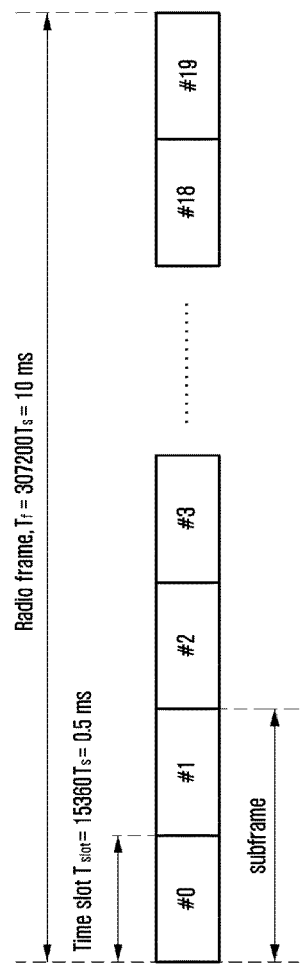
[Fig. 3]
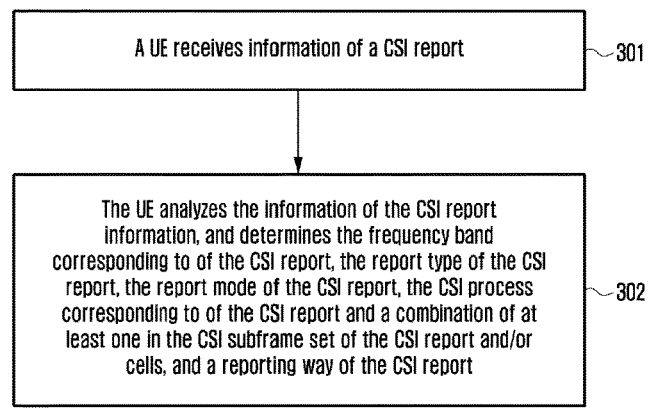
[Fig. 4]
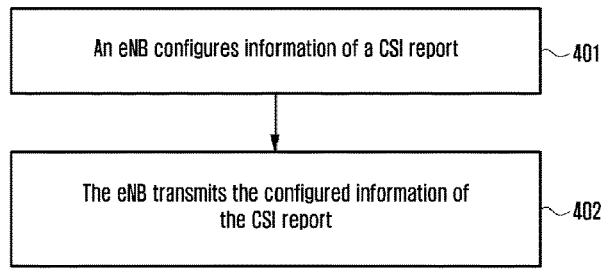

[Fig. 5]
[Fig. 6]
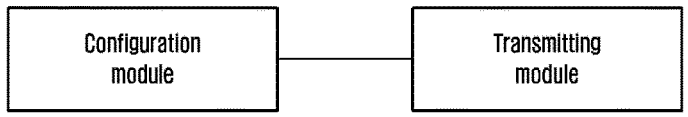
[Fig. 7]
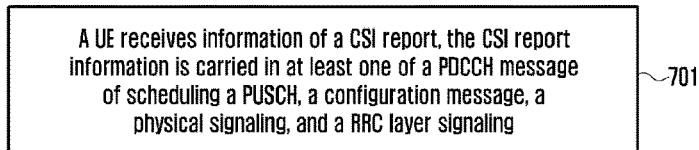
[Fig. 8]
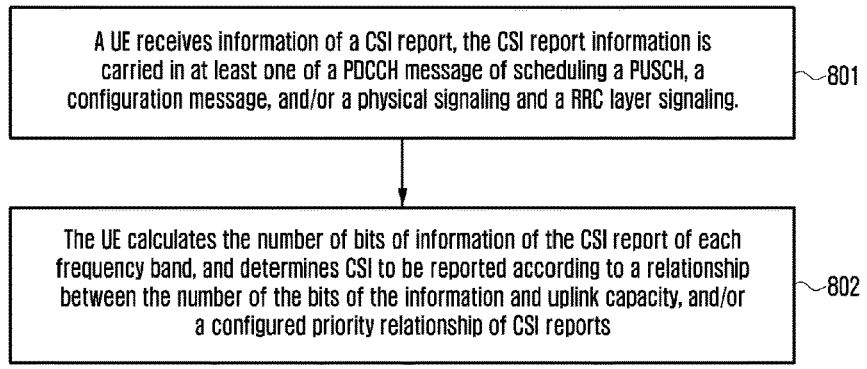
[Fig. 9]
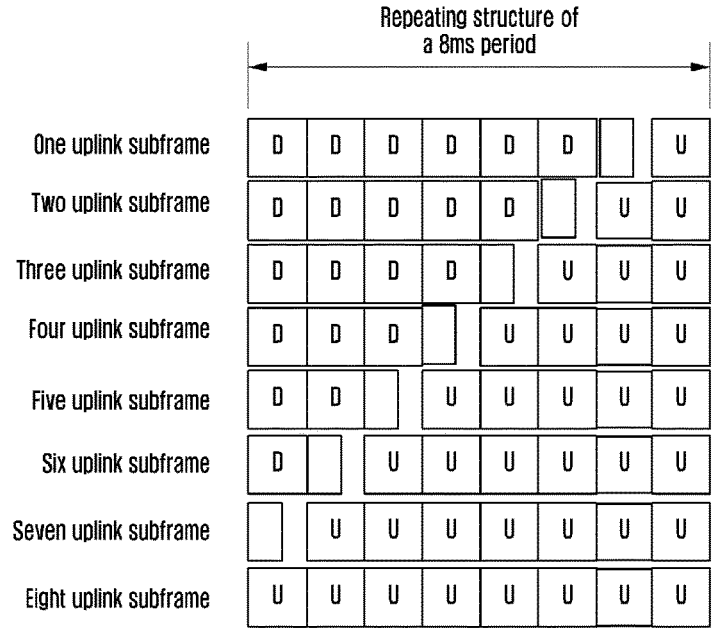

[Fig. 10]
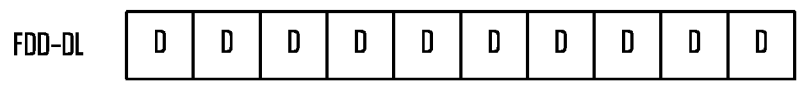
[Fig. 11]
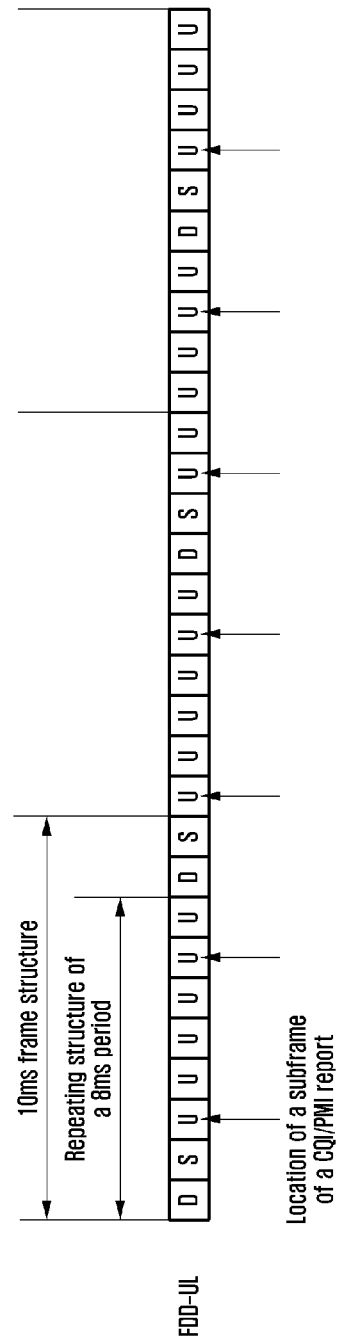

METHOD AND APPARATUS FOR REPORTING CHANNEL STATE INFORMATION

PRIORITY

This application is a National Phase Entry of PCT International Application No. PCT/KR2015/004159 which was filed on Apr. 27, 2015, and claims priority to Chinese Patent Application No. 201410174929.6, which was filed on Apr. 28, 2014, the contents of each of which are incorporated herein by reference.

TECHNICAL FIELD

The present invention relates to a mobile communication technology field, and more particularly, to a method and apparatus for reporting channel state information (CSI).

BACKGROUND ART

In a wireless communication system, a Frequency Division Duplex (FDD) mode and a Time Division Duplex (TDD) mode are widely adopted. For the FDD mode, different frequency resources are respectively used for uplink communication and downlink communication. For the TDD mode, a same frequency resource is shared for both the uplink communication and the downlinkcommunication, and the uplink communication and the downlink communication are respectively performed by dividing time domain.

A 3GPP Long Term Evolution (LTE) system can support both the FDD mode and the TDD mode. Radio frame structures include a frame structure for the FDD mode and a frame structure for the TDD mode. In the prior art, the frame structure for the FDD mode is as shown in FIG. 1. A 10 ms radio frame includes twenty 0.5 ms time slots respectively numbered from 0 to 19. A 1 ms subframe i with includes time slots 2i and 2i+1. Communication in uplink and downlink is respectively performed on the different frequency resources. In the prior art, a frame structure for the TDD mode is as shown in FIG. 2. A 10 ms radio frame includes two 5 ms half frames. Each half frame includes eight 0.5 ms time slots and three specific fields. The three specific fields include a downlink pilot time slot (DwPTS), a guard period (GP) and an uplink pilot time slot (UpPTS). A length of each of the three specific fields is 1 ms. Similarly, in the frame structure for the TDD mode, a subframe i includes time slots 2i and 2i+1. A same frequency resource is shared by the downlink and uplink Communication in uplink and downlink is respectively in different subframes.

In order to support an asymmetric service to improve spectral efficiency, seven kinds of different uplink-downlink configurations are supported in a current LTE TDD system. As shown in Table 1, D indicates a downlink subframe, U indicates an uplink subframe, S indicates a specific frame including one of the three specific fields.

TABLE 1

| Configuration index | Transition period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In a LTE FDD system, frequency resources to perform communication for user equipments (UE) are symmetrical. Thus, uplink resources and downlink resources are always available. A UE can feed an uplink control signaling in time, e.g., a Acknowledge/Non-Acknowledge (ACK/NACK) and CSI in a Hybrid Automatic Retransmission Request (HARQ). Thus, a time delay in a wireless interface of the LTE FDD system is reduced, and scheduling efficiency is improved.

With the development of wireless communication services, uplink and downlink of the communication services is more and more asymmetric. Some aspects cause the asymmetry of the communication services, which are related with natures of the communication services. For example, a network video service, a downloading service and a browsing service provided for the LTE system increases downlink traffic. While a social network service or a point-to-point (P2P) service provided for the LTE system increase uplink traffic. Thus, in the LTE FDD system, when the downlink traffic is too much, uplink frequency resources are wasted.

Considering the asymmetry of services in further, more particularly, requirements for downlink services are more than that for uplink services, in a wireless communication system, the TDD mode and FDD mode may be flexibly adopted for different scenarios so as to improve spectrum efficiency and system performance. A possible mixed structure includes that in the LTE FDD system, a part of uplink subframes or uplink resources of an uplink frequency band are occupied by downlink subframes, or are occupied by services of another non-cellular communication. For example, in current 3GPP RAN1 discussion, a Device to Device (D2D) communication technology is defined. According to current RAN1 discussion about the D2D communication technology, the D2D communication covered by a LTE FDD cell occupies the uplink resource, i.e., an uplink carrier in the FDD cell is a uplink subframe of a TDD cell.

For the flexible structure, the uplink frequency band of the FDD mode can adopt an uplink-downlink configuration similar as that in the LTE TDD system, or can adopt a re-defined uplink-downlink configuration. Based on an eNB reconfiguration technology, i.e., an uplink-downlink configuration in the uplink frequency band of the FDD mode is adjusted via a dynamic signaling, a proportion of uplink subframes and downlink subframes can satisfy current uplink traffic and downlink traffic so as to improve uplink peak rate and downlink peak rate of UEs and to improve system throughput.

In a LTE/LTE-A system, a UE can obtain CSI according to a downlink reference signal, and then feeds the obtained CSI back to an eNB. The eNB determines a modulation-coding way and a location of a physical resource transmitted to the UE, and a transmission mode etc. There are four formats for the CSI, a Channel Quality Indicator (CQI), a Pre-coding Matrix Indicator (PMI), a re-coding Type Indicator (PTI), and a Rank Indicator (RI). In the LTE/LTE-A system, there are a periodic feedback and an aperiodic feedback for the CSI feedback of the downlink for the UE, which respectively are referred to as Aperiodic CSI (A-CSI) report and a Periodic CSI (P-CSI) report. A-CSI report includes a process that an eNB triggers a UE to feed CSI back on a Physical Uplink Shared Channel (PUSCH) once via a triggering signaling. A reporting condition includes that the UE receives a Downlink Control Indicator (DCI) format 0 on a downlink subframe or a random access response admission. A Channel Quality Indicator (CQI) request in the DCI format 0 may be configured with one of "01", "10" and "11" respectively corresponding to conditions that the UE works in a single-cell scenario and is configured with one of transmission modes 1-9, the UE works in a single-cell scenario and is configured with a transmission mode 10, and the UE works in a multiple-cell scenario and is configured with one of transmission modes 1-9. Thus, the UE transmits the A-CSI report on a PUSCH scheduled through the DCI format 0. The P-CSI report includes according to eNB configuration of the eNB, the UE periodically feeds the CSI back on a Physical Uplink Control Channel (PUCCH). For the P-CSI report, on a subframe that the PUSCH is not transmitted by the UE, the UE transmits the CSI on the PUCCH in the subframe, and on a subframe that the PUSCH is transmitted by the UE, the UE transmits the CSI on the PUSCH in the subframe. A period and a location offset in the period of the P-CSI report is determined by a system high layer configuration. In particular, the high layer configures a parameter cqi-pmi-Config-Index for the UE. The UE determines a subframe location of the CSI report by looking up a list. A reporting period supported by the LTE FDD system includes 2/5/10/20/40/80/160. When the UE is in a Discontinuous Reception (DRX) mode, the reporting period supported by the LTE FDD system includes 32/64/128. The reporting period supported by the LTE TDD system includes 1/5/10/20/40/80/160.

For the LTE FDD system, each downlink subframe corresponds to an uplink subframe. A corresponding relationship to the downlink subframe and the uplink subframe is pre-configured, and is notified to the UE by the eNB, i.e., an uplink scheduling timing relationship including an ACK/NACK feedback and a CSI report. For the LTE TDD system, the uplink scheduling timing relationship relates to uplink-downlink configuration of a cellular cell. It is assumed that UE receives the PDCCH on a downlink subframe n, the PDCCH controls an uplink subframe n+k, wherein a value of the k is defined in Table 2.

TABLE 2

| Configuration index | Downlink subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | 4 | | 6 | | | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For the flexible structure that a part of uplink subframes in an uplink frequency band for the FDD mode are occupied by downlink subframes, it means downlink transmission can be performed on the downlink frequency band of the FDD mode and the part of the uplink subframes that are on the uplink frequency band and are used as the downlink band. Thus, only one uplink frequency band can be scheduled to report the CSI of a corresponding frequency band, wherein the CSI is used for the eNB to perform scheduling of the downlink transmission.

DISCLOSURE OF INVENTION

Technical Problem

In the condition, there are the following problems to be solved: how an A-CSI is triggered and indicated; how a CSI request field of the DCI format 0 is defined on a Physical Downlink Control Channel (PDCCH); for a given uplink subframe in the uplink frequency band, in case of collision between A-CSI reports respectively triggered in downlink subframes of two frequency bands, when pieces of CSI respectively measured for the two downlink subframes are on different frequency bands, how priorities of the pieces of CSI measured for the two downlink subframes are distinguished; in addition, since the part of the subframes on the uplink frequency band in the LTE FDD system is used for downlink, an uplink scheduling relationship cannot use the part of the subframes, whether new CSI report period configured is defined. Thus, these problems above will impact the CSI report of the UE, will further impact the downlink transmission of the UE, and will impact cell throughput of the LTE system. There is not a technical solution for the problems above at present.

Solution to Problem

A method for report CSI is provided according to an embodiment of the present invention so as to ensure in a condition that a part of uplink subframes in an uplink frequency band is occupied, transmission of a CSI report of the UE is not impact.

An apparatus for report CSI is provided according to an embodiment of the present invention so as to ensure in a condition that a part of uplink subframes in an uplink frequency band is occupied, transmission of a CSI report of the UE is not impact.

A method for reporting channel state information (CSI) includes:
receiving, by a user equipment (UE), information of a CSI report;
analyzing, by the UE, the information of the CSI report;
determining, by the UE, a frequency band of the CSI report, a report type of the CSI report, a report mode of the CSI report, a CSI process of the CSI report, a combination of at least one in a CSI subframe set and/or cells, and a report way of the CSI report.

A method for reporting CSI includes:
configuring, by an evolved Node Base station (eNB), information of a CSI report;
transmitting, by the eNB, the configured information of the CSI report.

An apparatus for report CSI includes:
a receiving module, to receive information of a CSI report;
an analyzing module, to analyze the information of the CSI report, and determine a frequency band of the CSI report, a report type of the CSI report, a report mode of the CSI report, a CSI process of the CSI report, a combination of at least one in a CSI subframe set and/or cells, and a report way of the CSI report.

An apparatus for reporting CSI includes:
a configuration module, to configure information of a CSI report;

a transmitting module, to transmit the configured information of the CSI report.

Advantageous Effects of Invention

It can be seen from the above, in a condition that in a FDD system, a part of uplink subframes in downlink frequency bands and/or uplink frequency bands are taken as downlink subframes for downlink transmission and CSI reports are in an uplink frequency bands, a UE receives information of a CSI report, analyzes the information of the CSI report, and determines a frequency band of the CSI report, a report type of the CSI report, a report mode of the CSI report, a CSI process of the CSI report, a combination of at least one in a CSI subframe set and/or cells, and a report way of the CSI report. Thus, in a condition that a part of uplink subframes in an uplink frequency band is occupied, transmission of a CSI report of the UE is not impact.

BRIEF DESCRIPTION OF DRAWINGS

FIG. 1 is a schematic diagram illustrating a frame structure of a FDD mode in the prior art;

FIG. 2 is a schematic diagram illustrating a frame structure of a TDD mode in the prior art;

FIG. 3 is a flowchart illustrating a method for reporting CSI according to an embodiment of the present invention;

FIG. 4 is a flowchart illustrating a method that an eNB transmits information of a CSI report according to an embodiment of the present invention;

FIG. 5 is a schematic diagram illustrating a structure of a UE according to an embodiment of the present invention;

FIG. 6 is a schematic diagram illustrating a structure of an eNB according to an embodiment of the present invention;

FIG. 7 is a flowchart illustrating a method for selecting a frequency band to perform an A-CSI report according to an embodiment of the present invention;

FIG. 8 is a flowchart illustrating a method for selecting a part of a CSI report in a frequency band when an A-CSI report is performed according to an embodiment of the present invention;

FIG. 9 is a schematic diagram illustrating a structure of a configuration of uplink timing slots and downlink timing slots according to an embodiment of the present invention;

FIG. 10 is a schematic diagram illustrating a first structure of a configuration of uplink timing slots and downlink timing slots in a FDD uplink frequency band according to an embodiment of the present invention;

FIG. 11 is a schematic diagram illustrating a second structure of a configuration of uplink timing slots and downlink timing slots in a FDD uplink frequency band according to an embodiment of the present invention.

BEST MODE FOR CARRYING OUT THE INVENTION

In order to make the object, technical solution and merits of the present invention clearer, the present invention will be illustrated in detail hereinafter with reference to the accompanying drawings and specific examples.

As described in background, in order to solve a problem of asymmetry of downlink services and uplink services in a LTE FDD system, a flexible duplex communication is introduced. For example, a part of uplink subframes in an uplink frequency band of a LTE FDD system is used to transmit downlink subframes. In the LTE FDD system, UE may receive downlink transmission from the two frequency bands, thus, the LTE FDD system is referred to as a flexible LTE FDD system. However, the UE performs a CSI report on an uplink frequency band. In order to make scheduling of a corresponding downlink frequency band better, the UE performs the CSI report including an A-CSI report and a P-CSI report. There are problems to be solved as follows: how CSI reports respectively on two frequency bands are indicated and triggered for the A-CSI report; how a corresponding reporting period is configured for the P-CSI report; when the CSI reports of the two frequency bands are carried on a same uplink subframe, how a collision is solved.

The method applies to a scenario that in a frequency division duplex (FDD) system, a part of uplink subframes in a downlink frequency band and/or an uplink frequency band is changed to downlink subframes for data transmission, and a CSI report is performed on an uplink frequency band.

FIG. 3 is a flowchart illustrating a method for reporting CSI according to an embodiment of the present invention. The method includes procedures as follows.

At block 301, a UE receives information of a CSI report.

The information of the CSI report is carried in at least one of an uplink scheduling request (UL-grant), an information field of the UI-grant, a PDCCH message of scheduling a PUSCH, a configuration message, a physical layer signaling and a RRC layer signaling.

The information of the CSI report includes at least one of a frequency band of the CSI report, a report type of the CSI report, a report mode of the CSI report, a CSI process of the CSI report, a cell carrier of the CSI report, a CSI subframe set, a reporting way of the CSI report, a configuration message. When the report way of the CSI report is the P-CSI report, the information of the CSI report further includes a report period and a report offset.

When the CSI report way is the P-CSI report, the information of the CSI report may be transmitted via the configuration message or the physical layer signaling.

The configuration message and the physical layer signaling may further include the frequency band of the CSI report in the information of the CSI report and/or a priority rule.

The RRC layer signaling may further include the frequency band of the CSI report in the information of the CSI report and/or a priority rule.

At block 302, the UE analyzes the information of the CSI report information, and determines the frequency band corresponding to of the CSI report, the report type of the CSI report, the report mode of the CSI report, the CSI process corresponding to of the CSI report and a combination of at least one in the CSI subframe set of the CSI report and/or cells, and a reporting way of the CSI report.

The UE may determine whether the A-CSI report is triggered and the frequency band of the CSI report according to the UI-grant.

The UE may further determine the frequency band on which the A-CSI report is triggered according to the information field of the uplink scheduling request UL-grant.

According to the CSI request field of the PDCCH message, the UE may determine whether the A-CSI report is triggered and may determine the frequency band of the CSI.

According to the configuration message, the UE may determine that the report way of the CSI report is the A-CSI report.

The UE may further determine the frequency band of the CSI report by analyzing the physical layer signaling or the configuration message.

By analyzing the physical layer signaling or the configuration message, the UE may further determine that the report way of the CSI report is the P-CSI report, and may further determine the report period and the report offset.

When the P-CSI report is performed, the P-CSI report is carried on the PUCCH. When the A-CSI report is performed, the A-CSI report is carried on the PUSCH. When both the P-CSI report and the A-CSI are performed at the same time, the P-CSI report and the A-CSI report are carried on the PUCCH at the same time.

FIG. 4 is a flowchart illustrating a method that an eNB transmits information of a CSI report according to an embodiment of the present invention. The method includes procedures as follows.

At block 401, an eNB configures information of a CSI report.

At block 402, the eNB transmits the configured information of the CSI report.

The information of the CSI report is carried in at least one of a UL-grant, an information field of the UI-grant, a PDCCH message of scheduling a PUSCH, a configuration message, a physical layer signaling and a RRC layer signaling.

FIG. 5 is a schematic diagram illustrating a structure of a UE according to an embodiment of the present invention. The UE includes a receiving module and an analyzing module.

The receiving module is to receive information of a CSI report. The information of the CSI report is carried in at least one of a UL-grant, an information field of the UI-grant, a PDCCH message of scheduling a PUSCH, a configuration message, a physical layer signaling and a RRC layer signaling.

The analyzing module is to analyze the information of the CSI report, and determine a frequency band of the CSI report, a report type of the CSI report, a report mode of the CSI report, a CSI process of the CSI report, a combination of at least one in a CSI subframe set and/or cells, and a report way of the CSI report.

FIG. 6 is a schematic diagram illustrating a structure of an eNB according to an embodiment of the present invention. The eNB includes a configuration module and a transmitting module.

The configuration module is to configure information of a CSI report.

The transmitting module is to carry the information of the CSI report in at least one of a UL-grant, an information field of the UI-grant, a PDCCH message of scheduling a PUSCH, a configuration message, a physical layer signaling and a RRC layer signaling.

According to a report way of a CSI report performed by a UE, a frequency band in information of the CSI report and configuration such as a report period and a report offset of A-CSI reports on two frequency bands, a method for reporting CSI is described in detail as follow.

In order to make description convenient, in a flexible LTE FDD system a downlink subframe on a downlink frequency band is referred to as a FDD-DL, an uplink subframe on an uplink frequency band for uplink transmission is referred to as a FDD-UL, and a part of uplink subframes changed to downlink subframe on an uplink frequency band is referred to as a FDD-UL-DL.

Embodiment 1

A method that a UE determines whether an A-CSI report is triggered on a FDD-UL and determines on which frequency band the CSI report is indicated to be triggered is provided according to an embodiment of the present invention.

In current RAN1 discussion, when a certain PUSCH on a first n+k subframe is scheduled, an eNB transmits a corresponding PDCCH on a first n subframe for performing scheduling. For a LTE FDD system, k is equal to 4. For a LTE TDD system, k is determined based on a designed configuration relationship of uplink subframes and downlink subframes. A CSI request field of a DCI format on the PDCCH carrying information of scheduling the PUSCH determines whether the UE triggers the A-CSI report on the PUSCH. Alternatively, whether a random access request is received determines whether the UE triggers the A-CSI report on the PUSCH. For example, when the TDD system is configured with a multiple-antenna transmission mode, the UE determines whether an A-CSI report is triggered on the PUSCH according to a CSI request field carried on a DCI format 0 or a DCI format 4 on the PDCCH.

In a flexible FDD system, downlink data may be transmitted on two carries. CSI reported on downlink subframes of two carriers is fed back. Thus, for the A-CSI report, a frequency band corresponding to the CSI of the A-CSI report is indicated, i.e., it is distinguished whether the CSI on the FDD-DL or the CSI on the FDD-UL-DL is triggered.

It is assumed that an UL-Grant may be respectively transmitted on the FDD-DL and FDD-UL-DL. According to a method for indicating a frequency band of CSI on a PUSCH through an A-CSI report, the frequency band is determined according to the frequency on which the UL-Grant is received by the UE. For example, when receiving the UL-Grant on the FDD-DL for indicating to trigger the A-CSI report, the UE reports the CSI on the FDD-DL. When receiving the UL-Grant on the FDD-UL-DL for indicating to trigger the A-CSI report, the UE reports the CSI on the FDD-UL-DL.

It is assumed in a flexible FDD system, the eNB transmits a corresponding UL-Grant on the FDD-DL. According to a method for indicating a frequency band of CSI of an A-CSI report on a PUSCH through an A-CSI report, the frequency band of the CSI report is indicated through an information field of the UL-Grant. For example, the frequency band of the triggered A-CSI report is indicated through a bit information indicator added into the UL-Grant. In particular, a bit value 0 indicates that the CSI on the FDD-DL is triggered, and a bit value 1 indicates the CSI on the FDD-UL-DL is triggered. Alternatively, a frequency band of the A-CSI report is indicated by multiplexing a current information field. For example, a 3 bit code unused in a Carrier indicator (CIF) is used. FIG. 3 is a flowchart illustrating a method for indicating an A-CSI report based on an unused code in a CIF field according to an embodiment of the present invention.

TABLE 3

| Unused code in a CIF field | Description |
| --- | --- |
| 000 | An A-CSI report of a FDD-DL is triggered |
| 001 | An A-CSI report of a FDD-UL-DL is triggered |

In another method for indicating a frequency band of CSI of an A-CSI report on a PUSCH, a frequency band of CSI of the A-CSI report on the PUSCH is indicated according to high layer configuration or broadcasting information. For example, the A-CSI report of the FDD-DL is notified to the UE through a high layer semi-static configuration, broadcasting information, a physical layer signaling, or a RRC layer signaling.

In another method for indicating a frequency band of CSI of an A-CSI report on a PUSCH, a frequency band of CSI of an A-CSI report on a PUSCH is indicated according to a downlink proportion or a priority indicator of downlink services on two frequency bands. For example, in the flexible FDD system, an entire downlink frequency band is used for downlink transmission. In order to ensure effectiveness of transmission on a downlink subframe of the downlink frequency band in the flexible FDD system, the UE reports the CSI of the downlink subframe on the PUSCH in the flexible FDD system. For example, when a priority of a service carried on the FDD-UL-DL is higher than a priority of a service carried on the FDD-DL, the UE selects CSI of the A-CSI report on the FDD-UL-DL to be reported on the PUSCH.

In another example for indicating a frequency band of CSI of an A-CSI report on a PUSCH, a frequency band of CSI of an A-CSI report on a PUSCH is indicated according to a CSI request field of the received DCI format 0 or the received DCI format 4 for scheduling the PUSCH. A method for indicating and displaying a CSI request field in a condition of configuring a signal flexible cell for a UE and a method for indicating and displaying a CSI request field in a condition of configuring multiple flexible cells for a UE are respectively represented as follows.

It is assumed that a flexible FDD cell is configured for the UE. In the flexible FDD cell, a frequency band of the FDD-DL and a frequency band of the FDD-UL-DL are respectively considered as a same cell. It is assumed that the CSI request field includes 2 bits. Codes "01", "10" and "11" of the FDD-DL and FDD-UL-DL indicates on which one or two frequency bands the A-CSI report is triggered, or a reserved code is not used.

For example, the code "01" indicates that the CSI on the FDD-DL is triggered, the code "10" indicates that the CSI on the FDD-UL-DL is triggered, the code "11" indicates that trigger one or more pieces of CSI of one or more frequency bands are triggered by the high layer signaling, or "11" is reserved and is not used. Table 4 represents a method for indicating a frequency band of an A-CSI report.

TABLE 4

| Value of CSI request field | Description |
| --- | --- |
| 00 | No A-CSI report is triggered |
| 01 | An A-CSI report for the FDD-DLis triggered |
| 10 | An A-CSI report for the FDD-UL-DL is triggered |
| 11 | An A-CSI report is triggered for a frequency band configured by high layers |

In another example, the code "01" indicates that the CSI on the FDD-DL is trigged. Codes "10" and "11" indicate that the CSI is triggered on one or more frequency bands by higher layers. Table 5 represents a method for indicating a frequency band of an A-CSI report.

TABLE 5

| Value of CSI request field | Description |
| --- | --- |
| 00 | NoA-CSI report is triggered |
| 01 | An A-CSI report for the FDD-DL is triggered |

TABLE 5-continued

| Value of CSI request field | Description |
| --- | --- |
| 10 | An A-CSI report is triggered for a frequency band configured by high layers |
| 11 | An A-CSI report is triggered for a frequency band configured by high layers |

It is assumed that multiple flexible FDD cells are configured for the UE. In a flexible cell, a frequency band of the FDD-DL and a frequency band of the FDD-UL-DL are taken as a same cell, i.e., the UE works on a CA mode. When the UL-Grant schedules the PUSCH of the flexible FDD cell and triggers the A-CSI report at the same time, "01" may be defined to trigger CSI of the FDD-DL of the flexible cell, or may be defined to trigger CSI of the FDD-DL and the FDD-UL-DL of the flexible cell. "01" may be pre-defined or may be configured by higher layers. "10" and "11" may be used to configure in which cell and on which frequency band the CSI is triggered by higher layers. Table 6 represents a method for indicating an A-CSI report.

TABLE 6

| Value of CSI request field | Description |
| --- | --- |
| 00 | No A-CSI report is triggered |
| 01 | An A-CSI report of a FDD-DL of a serving cell c is triggered, or an A-CSI report of a FDD-DL of the serving cell c and an A-CSI report of a FDD-UL-DL of the serving cell c are triggered |
| 10 | An A-CSI report is triggered for a frequency band or a serving cell configured by high layers |
| 11 | An A-CSI report is triggered for a frequency band or a cell configured by high layers |

It is assumed the UE is configured with a serving cell and configured in the transmission mode TM10 by the high layers, or the UE is configured with more than one serving cell and configured in the transmission mode TM10 by the high layers. When the UL-Grant is used for scheduling the PUSCH of a flexible FDD cell and triggering the A-CSI report at the same time, "01" is defined to trigger the A-CSI report of a CSI process of the FDD-DL of the flexible FDD cell, or is defined to trigger the A-CSI report of a CSI process of the FDD-DL and the FDD-UL-DL of the flexible FDD cell. "01" may be configured by higher layers "10" and "11" may be used to configure in which cell or on which frequency band the CSI process is triggered by higher layers Table 7 represents a method for indicating a frequency band of an A-CSI report.

TABLE 7

| Value of CSI request field | Description |
| --- | --- |
| 00 | No A-CSI report is triggerred |
| 01 | an A-CSI report is triggered for a CSI process of a FDD-DL of a serving cell c configured by, or an A-CSI report is triggered for a CSI process of a FDD-DL of a serving cell c and an A-CSI report is triggered for a CSI process of a FDD-UL-DL of a serving cell c configured by higher layers |
| 10 | an A-CSI report is triggered for a CSI process of a frequency band or a cell configured by higher layers |

TABLE 7-continued

| Value of CSI request field | Description |
| --- | --- |
| 11 | an A-CSI report is triggered for a CSI process of a frequency band or a cell configured by higher layers |

It is assumed that the CSI request field indicates that a CSI of a certain CSI subframe set is triggered. In definition of codes "01", "10" and "11", a CSI subframe set of a CSI process is defined. When the UL-Grant is used for scheduling the PUSCH of a flexible FDD cell and triggering the A-CSI report, "01" may be defined to trigger the A-CSI report of a CSI process of the FDD-DL of the flexible FDD cell, or may be defined to trigger the A-CSI report of a CSI process of the FDD-DL and the FDD-UL-DL of the flexible FDD cell. "01" may be configured by higher layers "10" and "11" may be used to configure in which cell or on which frequency band the A-CSI report of a CSI subframe set is triggered by higher layers. Table 8 represents a method for indicating a frequency band of an A-CSI report.

TABLE 8

| Value of CSI request field | Description |
| --- | --- |
| 00 | No A-CSI report is triggered |
| 01 | an A-CSI report is triggered for a CSI subframe set of a CSI process of a FDD-DL of a serving cell c configured by higher layers, or an A-CSI report is triggered for a CSI subframe set of a CSI process of a FDD-DL of a serving cell c and an A-CSI report is triggered for a CSI subframe set of a CSI process of a FDD-UL-DL of a serving cell c configured by higher layers |
| 10 | an A-CSI report is triggered for a CSI subframe set of a CSI process of a frequency band or a cell configured by high layers |
| 11 | an A-CSI report is triggered for a CSI subframe set of a CSI process of a frequency band or a cell configured by higher layers |

In the conditions above, the CSI request field with 1 bit may be processed similarly as "01" of the CSI request field with 2 bit. In particular, "1" may be defined to trigger an A-CSI report of the FDD-DL of the flexible cell, or may be defined to trigger an A-CSI report of the FDD-DL and the FDD-UL-DL of the flexible cell at the same time. "1" may be pre-defined, or may be configured by higher layers It is assumed that two frequency bands of a flexible FDD cell, i.e., the FDD-DL and the FDD-UL-DL are taken as two independent cells, and the UE works in a CA mode. For example, a cell corresponding to the FDD-DL is a 1st set of serving cells, and a cell corresponding to the FDD-UL-DL is a 2nd set of the serving cells. When the UL-Grant is used for scheduling the PUSCH of the cell and triggering the A-CSI report at the same time, "01" may be defined to trigger the A-CSI report of theist set of the serving cells or may be defined to trigger the A-CSI report of the 2nd set of the serving cells at the same time. "01" may be pre-defined, or may be configured by higher layers. "10" or "11" may be configured to trigger CSI of a cell corresponding to the FDD-DL and a cell corresponding to the FDD-UL-DL. Table 9 represents a method for indicating a frequency band of an A-CSI report.

TABLE 9

| Value of CSI request field | Description |
| --- | --- |
| 00 | No A-CSI report is triggered |
| 01 | An A-CSI report of a serving cell c is triggered |
| 10 | An A-CSI report is triggered for 1st set of serving cells configured by high layers |
| 11 | An A-CSI report is triggered for 2st set of serving cells configured by high layers |

It is assumed that multiple flexible FDD cells are configured for the UE, a FDD-DL and a FDD-UL-DL of each flexible FDD cell are respectively taken as two independent cells, and the UE works in a CA mode. For example, a cell group including cells corresponding to FDD-DLs of the multiple flexible FDD cells is defined as a 1st set of the serving cell, and a cell group including cells corresponding to FDD-UL-DLs of the multiple flexible FDD cells is defined as a 2nd set of the serving cell. When the UL-Grant is used for scheduling the PUSCH of the cell and triggering the A-CSI report at the same time, "01" may be defined to trigger the A-CSI report of a cell in a 1st set of the serving cell or may be defined to trigger the A-CSI report of a cell in a 1st set of the serving cell and the A-CSI report of a cell in a 2nd set of the serving cell at the same time. "01" may be pre-defined, or may be configured by the higher layers. "10" or "11" may be configured to trigger CSI of a cell corresponding to a FDD-DL and CSI of a cell corresponding to a FDD-UL-DL. Table 10 represents a method for indicating a frequency band of an A-CSI report.

TABLE 10

| Value of CSI request field | Description |
| --- | --- |
| 00 | No A-CSI report is triggered |
| 01 | An A-CSI report of a serving cell c is triggered |
| 10 | An A-CSI report is triggered for 1st set of serving cells configured by high layers |
| 11 | an A-CSI report is triggered for 2st set of serving cells group configured by high layers |

So far, a process of embodiment 1 finishes. A method that a UE determines whether an A-CSI report is triggered on a FDD-UL and determines on which frequency band the CSI report is indicated to be triggered is provided according to an embodiment of the present invention. A UE determines indication according to a frequency band on which a UL-grant is received, or determines indication according to an information field of the received UL-grant. Alternatively, through any of high layer semi-static configuration, broadcasting information, a physical layer signaling, or a RRC layer message, a downlink proportion of two frequency bands, a priority characteristic of a downlink service and a CSI request field of the received PDCCH, it is indicated whether an A-CSI report is indicated and on which frequency band the A-CSI report is triggered.

Embodiment 2

In the embodiment, when CSI on a FDD-DL and CSI on a FDD-UL-DL are reported through an A-CSI report on a same FDD-UL, in case of collision between a CSI report of a FDD-DL and a CSI report of a FDD-UL-DL, a UE selects a frequency band corresponding to the A-CSI report to be performed.

According to current RAN1 discussion, the A-CSI report is carried on the PUSCH. It is assumed an uplink scheduling request may be transmitted on a downlink subframe on any of two frequency bands to trigger a corresponding CSI report on the PUSCH. When a PUSCH resource configured by a high layer only can carry CSI of a frequency band, the UE selects on which frequency band the A-CSI report is performed according to a priority rule.

FIG. 7 is a flowchart illustrating a method for selecting a frequency band to perform an A-CSI report when the A-CSI is performed according to an embodiment of the present invention. The method includes procedures as follows.

At block 701, a UE receives information of a CSI report.

The CSI report information is carried in at least one of a PDCCH message of scheduling a PUSCH, a configuration message, a physical signaling, and a RRC layer signaling. The information of the CSI report may include a frequency band of the CSI report, a report type of the CSI report, a report mode of the CSI report, a CSI process of the CSI report, and a cell carrier or a CSI subframe set corresponding to the CSI report.

At block 702, the UE selects a frequency band corresponding to the A-CSI report according to the priority rule.

Priority rules as follows are provided according to an embodiment of the present invention. A flexible FDD cell is respectively taken as a cell or two cells as follows.

It is assumed two frequency bands in the flexible cell are considered as a cell.

When the UE is configured with a flexible cell by a high layer, for A-CSI reports conflicting with each other, the UE determines on which frequency band the A-CSI report is selected to be performed according to the priority rule.

In the method, the frequency band corresponding to the A-CSI report on the PUSCH is indicated according to high layer configuration or broadcasting information. When the CSI request field is "1", "01", "10", or "11", the UE is notified on which frequency band corresponding to the A-CSI report on PUSCH of the LTE FDD system the A-CSI report is performed according to higher layers configuration or broadcasting information.

In another method, a frequency band corresponding to an A-CSI report on the PUSCH is indicated according to a downlink proportion or priorities of downlink services of two frequencies. For example, when a priority of the FDD-DL is higher than a priority of the FDD-UL-DL, the UE selects CSI of the FDD-DL subframe to be reported through the A-CSI report on the PUSCH.

In another method, a frequency band corresponding to an A-CSI report on the PUSCH is indicated according to a priority of an A-CSI report mode of each frequency band configured by a high layer. In current RAN1 discussion, there are three report modes for the A-CSI report respectively corresponding to a wide-band CQI report, a sub-band CQI reported selected by the UE and a sub-band CQI configured by the high layer. When reported modes of the PMI are distinguished, there are five different report modes. Different transmission mode may support different report modes. The different report modes correspond to different performance object requirement. The UE may perform a CSI report according to priorities of different report modes. When a corresponding CSI request field is "1", "01", "10" or "11" and the CSI on the FDD-UL configured by the high layers is the wide-band CQI and the CSI on the FDD-UL configured by the higher layers is the sub-band CQI of a FDD-UL-DL subframe, the UE selects that the A-CSI report performed on the PUSCH is the CSI on the FDD-UL-DL.

A priority rule is determined according to a priority of a CSI process corresponding CSI measurement. Multiple CSI processes are configured by the high layer. For example, a TM10 transmission mode is configured by the high layer for the UE, the UE measures and reports information of multiple pieces of CSI of multiple CSI processes. For example, it may be defined that a priority of a 1st set of CSI process is higher than a priority of a 2nd set of the CSI processes. When the high layer configures that a process on the FDD-DL is the 1st set of the CSI processes, and a process on the FDD-UL-DL is the 2nd set of the CSI processes. According to priorities, the UE selects to report the information of the CSI corresponding to the 1st set of the CSI processes on the FDD-DL.

In another method, a frequency band corresponding to an A-CSI report on the PUSCH is indicated according to priorities of respective report modes of respective A-CSI reports configured by the high layer and priorities of respective frequency bands. The UE firstly compares priorities of report modes of A-CSI reports of respective two frequency bands. When the priorities of report modes of the respective two frequency bands are same, the frequency band corresponding to the A-CSI report is determined according to a relationship of priorities of frequencies or carriers configured by the high layers. For example, when it is configured by the high layer that the wide-band CQI of the FDD-DL and the wide-band CQI the FDD-UL-DL are reported and the priority of the FDD-DL is higher than the priority of the FDD-UL-DL, i.e., the priorities of the report modes of the two frequency bands are same, the UE selects the CSI on the FDD-DL to be reported.

In another method, a frequency band corresponding to an A-CSI report on the PUSCH is indicated according to a priority of a report mode of an A-CSI report configured by the high layer, and a CSI process index and a priority of a frequency band. For example, multiple CSI processes are configured for the UE by the high layer. The UE reports information of CSI for the multiple CSI processes. For A-CSI reports conflicting with each other, the frequency band corresponding to the A-CSI report is determined by the UE according to the priorities of the report modes of the A-CSI reports. When the two frequency bands have a same report mode, CSI process indexes are compared. When the A-CSI reports conflicting with each other have a same CSI process index, the frequency band corresponding to the A-CSI report is determined according to the priorities of the frequency bands. For example, a priority of the FDD-DL is higher than a priority of the FDD-UL-DL. Table 11 defines a method of a priority of an A-CSI report.

TABLE 11

| First priority | Second priority | Third priority |
| --- | --- | --- |
| Report mode of an A-CSI report | CSI process index | Different frequency bands in a same flexible FDD cell |

When multiple cells are configured for a UE by the high layer, the UE works in a CA mode. For two A-CSI reports conflicting with each other, the UE performs determination of the frequency band corresponding to the A-CSI report according to priorities of report modes of the A-CSI reports configured by the high layer. For a given FDD-UL subframe, in the case of collision between the A-CSI reports with the report modes of the same priority, CSI process indexes are compared. For a given FDD-UL subframe, in the case of collision between the P-CSI reports with the CSI process indexes of the same priority, carrier indexes are compared.

When collision occurs among different frequency bands in a same flexible cell, the UE performs determination of the frequency band corresponding to the A-CSI report according to priorities of the different frequency bands in the flexible cell. For example, a priority of the FDD-DL is higher than a priority of the FDD-UL-DL.

Table 12 defines a method of a priority of an A-CSI report.

TABLE 12

| First priority | Second priority | Third priority | Fourth priority |
| --- | --- | --- | --- |
| Report mode of an A-CSI report | CSI process index | carrier index | Different frequency bands in a same flexible FDD cell |

Table 13 defines another method of a priority of an A-CSI report.

TABLE 13

| First priority | Second priority | Third priority | Fourth priority |
| --- | --- | --- | --- |
| Report mode of an A-CSI report | CSI process index | Different frequency bands in a same flexible FDD cell | carrier index |

For A-CSI reports conflicting with each other, the UE firstly performs determination of the frequency band corresponding to the A-CSI report according to priorities of report modes of the A-CSI reports configured by the high layer. For a given FDD-UL subframe, in the case of collision between the P-CSI reports with the report modes of the same priority, CSI process indexes are compared. For a given FDD-UL subframe, in the case of collision between the A-CSI reports with CSI process indexes of the same priority, the frequency band corresponding to the A-CSI report is determined according to priorities of different frequency bands in a flexible cell. When the priorities of the different frequency bands are same, carrier indexes are compared. For example, a FDD-DL index is 0, and a FDD-UL frequency band index is 1. When the frequency bands are compared, it may be configured that a priority of a frequency band 0 is higher than a priority of a frequency band 1. When the priorities of the frequency bands are compared, a frequency band index may be pre-defined for a FDD cell or TDD cell working in a traditional work way. For example, a frequency band is fixedly processed in accordance with a frequency band 0.

It is assumed that two frequency bands of a flexible FDD cell is taken as two cells, a UE works in a CA mode. For example, it may be defined that a cell corresponding to a FDD-DL is a first category cell or a component carrier (CC) #0 and a cell corresponding to a FDD-UL-DL is a second category cell or a CC #1. A priority rule of A-CSI reports conflicting with each other may be same as that used at present to perform determination. The UE may firstly perform determination according to the priorities of report modes of various cells configured by the high layer. For a given FDD-UL subframe, in the case of collision between the A-CSI reports with report modes of the same priority, cell carrier indexes are compared. For example, Table 14 represents a method for defining a priority rule.

TABLE 14

| First priority | Second priority |
| --- | --- |
| Report mode of an A-CSI report | Carrier index |

When multiple CSI processes is configured for the UE by the high layer, the UE reports information of CSI of the multiple CSI processes. For the A-CSI reports conflicting with each other, the UE firstly performs determination of the frequency band corresponding to the A-CSI report according to report modes of the A-CSI reports configured by the high layer. For a given FDD-UL subframe, in the case of collision between the P-CSI reports with the report modes of the same priority, CSI process indexes are compared. For a given FDD-UL subframe, in the case of collision between the A-CSI reports with CSI process indexes of the same priority, determination is performed according to carrier indexes of cells. Table 15 represents a method for defining a priority rule.

TABLE 15

| First priority | Second priority | Third priority |
| --- | --- | --- |
| Report mode of an A-CSI report | CSI process index | Carrier index |

So far, a process according to embodiment 2 finishes. In the embodiment, when an A-CSI report of CSI of the FDD-DL and an A-CSI report of CSI of the FDD-UL-DL are performed on a same FDD-UL, the UE selects on which frequency band the CSI is reported according to a priority rule indicated by high layer configuration, a physical signaling, or a RRC layer signaling. The priority rule may be in accordance with priorities of a frequency bands, or in accordance with priorities of downlink services respectively transmitted on two frequency bands. When the two frequency bands of a flexible FDD cell is taken as a same cell, the high layer may configure a priority rule of a flexible rule. Furthermore, the frequency band on which the CSI is reported may be determined according to a priority of a report mode of an A-CSI report, a priority of a CSI process index corresponding to an A-CSI report configured by the high layer, a report mode, a CSI process index and a priority of a frequency band. When the high layer configures multiple flexible cells, the priority rule is determined according to a priority of a carrier index. When two frequency bands of a flexible cell is taken as different cells and the UE is configured to work in a CA mode by the high layer, the priority rule can still use definition in a current specification. For example, the frequency band corresponding to the A-CSI report is determined according to a report mode of a CSI report, a CSI process index and carrier indexes of different cells.

Embodiment 3

In the embodiment, when CSI of a FDD-DL and CSI of a FDD-UL-DL are reported respectively through an A-CSI report in a same FDD-UL subframe, a UE reports CSI of at least one frequency band.

According to current RAN1 discussion, an A-CSI report is carried in a PUSCH. For an uplink subframe, it is supported that the UE transmits CSI of different downlink carriers on the uplink subframe. For a flexible FDD duplex mode, an uplink scheduling request may be transmitted on a FDD-DL or a FDD-UL-DL to trigger an A-CSI report on the PUSCH. When PUSCH resources configured by the high layer may carry entire or a part of CSI of two frequency bands or two carries, the UE may select at least one piece of CSI of the two frequency bands to be reported. The CSI reported by the UE may include a CQI, a PMI and a RI. The high layer may configure the UE to report all or a part of the three kinds of information above in a PUSCH resource, which may be determined according to PUSCH resources configured by the high layer/uplink information capacity, and the number of bits of information of the CSI report, which may further be determined according to a priority of a report mode of the CSI report of the frequency band.

FIG. 8 is a flowchart illustrating a method for selecting a part of CSI reports of frequency bands when an A-CSI report is performed. The method includes procedures as follows.

At block 801, a UE receives information of a CSI report.

The CSI report information is carried in at least one of a PDCCH message of scheduling a PUSCH, a configuration message, and/or a physical signaling and a RRC layer signaling. The information of the CSI report may include at least one of a frequency band of the CSI report, a report type of the CSI report, a report mode of the CSI report, a CSI process of the CSI report, a cell carrier or a CSI subframe set of the CSI report.

At block 802, the UE calculates the number of bits of information of the CSI report of each frequency band, and determines CSI to be reported according to a relationship between the number of the bits of the information and uplink capacity, and/or a configured priority relationship of CSI reports.

The priority relationship of the CSI reports may include a priority relationship determined according to frequency bands corresponding to the CSI. For example, the CSI of the FDD-DL belongs to a first priority, and the CSI of the FDD-UL-DL belongs to a second priority. The priority relationship of the CSI reports may further include a priority relationship that is configured through a high layer in a semi-static way and is determined according to services respectively transmitted on uplink or downlink on two frequency bands. The priority relationship of the CSI reports may further include a priority relationship determined according to the report mode of the CSI report.

For example, a priority relationship may include that a RI belongs to the first priority, a wide-band CQI/PMI belongs to the second priority, a sub-band COI information belongs to a third priority. The priorities are shown in Table 16.

TABLE 16

| First priority | Second priority | Third priority |
| --- | --- | --- |
| RI | Wide-band CQI/PMI | Sub-band CQI, sub-band CQI/PMI |

The priority relationship above may be configured through a high layer, or may be pre-defined. For example, in a specification, a priority relationship list is pre-defined. The UE determines the corresponding CSI report by looking up the priority relationship list.

In different conditions of a relationship of the number of bits of information of the CSI report and uplink channel capacity, and/or a priority relationship of CSI reports, a method that a UE performs a CSI report is described.

A first method: according to the priority relationship determined based on frequency bands e.g., a priority of the FDD-DL is higher than a priority of the FDD-UL-DL, the UE performs the CSI report.

According to content of information of the CSI report configured by the high layer, the UE respectively calculates the numbers of the bits of information of the CSI of two frequency bands (the FDD-DL and the FDD-UL-DL).

In the current RAN1 discussion, the numbers of the bits of the information of the CQI/PMI carried respectively through different report modes are different. The number of the bits of the information of the CQI/PMI is determined by a transmission mode, an antenna port and rank information configured through the high layer. For example, for a transmission mode 4, a transmission mode 6, or a transmission mode 8 configured by the high layer to perform PMI/RI feedback, the UE performs a corresponding wide-band CQI report. The number of bits of the information of the CQI/PMI is shown in Table 17.

TABLE 17

| | The number of bits | | | |
| --- | --- | --- | --- | --- |
| | 2 antenna ports | | 4 antenna ports | |
| Report type | Rank = 1 | Rank = 2 | Rank = 1 | Rank > 1 |
| Wide-band CQI of code 0 | 4 | 4 | 4 | 4 |
| Wide-band CQI of code 1 | 0 | 4 | 0 | 4 |
| PMI | 2N | N | 4N | 4N |

For a sub-band CQI/PMI report configured for the UE through the high layer or a sub-band CQI/PMI report selected by the UE, the numbers of bits of information corresponding to the CQI/PMI may be different for different transmission modes, different antenna ports and different rank information.

For the A-CSI report, the corresponding CQI/PMI is carried on at least one of an uplink PUSCH, uplink data, a HARQ-ACK and a RI to perform duplex transmission. The tree categories of control information (CQI/PMI, HARQ-ACK, RI) are respectively coded and modulated. For example, when the high layer configures the UE to perform the A-CSI report, the UE calculates the corresponding number of bits of information of the CQI/PMI according to the report mode, and then calculates the number of bits after a coding process and a modulating process are performed:

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, \right.$$

$$\left. M_{sc}^{PUSCH} \cdot N_{symb}^{PUSCH} - \frac{Q_{RI}^{(x)}}{Q_m^{(x)}}\right)$$

wherein O is the number of bits of information of CQI/PMI to be reported, L is the number of bits of a Cyclical Redundancy Check (CRC), thus, the number of bits of information of the CQI/PMI is $Q_{CQI} = Q_m^{(x)} \cdot Q'$, wherein $Q_m^{(x)}$ is a modulation mode corresponding to a transmission code. In the formula above, when the high layer configures the UE does not perform an RI report, $Q_{RI}^{(x)} = 0$. $N_{symb}^{PUSCH-initial(x)}$ represents the number of OFDM symbols of a same code of performing initial PUSCH transmission. $M_{sc}^{PUSCH-initial(x)}$, $C^{(x)}$, and $K_r^{(x)}$ may be obtained by decoding the format 0 on the PDCCH or an EPDCCH.

For uplink data, the number of modulation symbols occupied by the uplink data is $G = N_L^{(x)} \cdot (N_{symb}^{PUSCH} \cdot M_{sc}^{PUSCH} \cdot Q_m^{(x)} - Q_{CQI} - Q_{RI}^{x})$, wherein $N_L^{(x)}$ represents the number of layers of a corresponding transmission code. $M_{sc}^{PUSCH}$ is a transmission bandwidth of the PUSCH scheduled in a current subframe. $N_{symb}^{PUSCH}=(2\cdot(N_{symb}^{UL}-1)-N_{SRS})$ is the number of OFDM symbols in the current subframe, a value is equal to $N_{symb}^{PUSCH}=(2\cdot(N_{symb}^{UL}-1)-N_{SRS})$, wherein $N_{SRS}$ is equal to 0 or 1, or determined according to SRS configuration.

According to a report mode of the A-CSI report of each frequency band configured by the high layer, the UE may calculate the number of bits of information carried in the CQI/PMI through the formula above.

It is assumed that the number of bits of information of the CSI of each frequency band is less than capacity of a physical uplink channel. The capacity of the uplink physical channel may be the number of bits that is carried in maximum uplink control information able to be carried in the uplink physical channel and is configured by the high layer, e.g., the maximum capacity supported by a PUCCH format 3 is 22 bits. Sum of the numbers of bits of respective two frequency bands is not more than the capacity of the uplink channel. The UE may perform duplex transmission on the PUSCH of a FDD-UL subframe to carry pieces of CSI of respective two frequency bands.

It is assumed that the numbers of the bits of the information of the CSI of respective the two frequency bands are respectively less than the capacity of the uplink channel, and the sum of the numbers of the bits of the information of the CSI of the respective two frequency bands is more than the capacity of the physical uplink channel, the UE may preferably report the CSI of the FDD-DL, and may discard the CSI of the FDD-UL-DL. Alternatively, the UE may preferably report the CSI of the FDD-DL, and may report information of the CSI of the FDD-UL-DL with a high priority in remained capacity. For example, the RI is configured to be reported by the high layer and the number of the bits of RI in the CSI of the FDD-DL and the number of the bits of the CSI of RI in the FDD-UL-DL is respectively not more than the capacity of the physical uplink channel. For the CSI of the frequency band not reported, related information of downlink transmission of the current frequency band is used as information such as MCS, PMI for downlink transmission on a corresponding frequency band to be scheduled by an eNB next time.

When CSI corresponding to respective two frequency bands is respectively more than the capacity of the physical uplink channel, according to a priority relationship, the UE may report information in the CSI of the FDD-DL with a high priority, e.g., RI or wide-band CQI, and may discard the CSI of the FDD-UL-DL. For the CSI of the frequency band not reported, related information of downlink transmission of the current frequency band is used as information such as MCS, PMI for downlink transmission on a corresponding frequency band to be scheduled by an eNB next time.

A second method: according to a priority determined based on a report mode of the CSI report, the UE performs the CSI report.

According to content of information of the CSI report configured by the high layer, the UE respectively calculates the numbers of bits of two frequency bands (the FDD-DL and the FDD-UL-DL).

When the numbers of the bits of the respective two frequency bands are respectively less than the capacity of the uplink physical channel and the sum of the numbers of the bits of the two frequency bands is not more than the capacity of the physical uplink channel, the UE may carry the CSI of the respective two frequency bands on the PUSCH of the FDD-UL at the same time to perform duplex transmission.

When the numbers of the bits of the two frequency bands are respectively less than the capacity of the uplink physical channel and the sum of the numbers of the bits of the two frequency bands is more than the capacity of the physical uplink channel, according to a priority relationship, the UE firstly reports the CSI of a frequency band with a highest priority. For example, the high layer configures that the CSI of the FDD-DL is configured with a sub-band CQI, and the CSI of the FDD-UL-DL is configured with a RI and a wide-band CQI. The UE may preferably report the CSI of the FDD-UL-DL, and discards the CSI of the FDD-DL. Alternatively, the UE may report the CSI of the FDD-UL-DL, and may report information with a high priority in the CSI in remained capacity. For the CSI of the frequency band not reported, related information of downlink transmission of the current frequency band is used as information such as MCS, PMI for downlink transmission on a corresponding frequency band to be scheduled by an eNB next time.

When the numbers of the bits of the CSI of respective two frequency bands are more than capacity of the uplink physical channel, the UE may report information with a high priority of the CSI of the FDD-DL, e.g., the RI and the wide-band CQI, and may discard the CSI of the FDD-UL-DL. For the CSI of the frequency band not reported, related information of downlink transmission of the current frequency band is used as information such as MCS, PMI for downlink transmission on a corresponding frequency band to be scheduled by an eNB next time.

So far, a process of the embodiment finishes. In the embodiment, a same subframe PUSCH carries the CSI of the two frequency bands. According to a relationship between sum of the numbers of the bits of frequency bands and the capacity of the uplink channel configured by the high layer and/or a priority relationship of reports, the UE reports entire CSI or a part of the CSI of a frequency band or reports entire CSI or a part of the CSI of the two frequency bands.

Embodiment 4

When a P-CSI report of a FDD-DL and a P-CSI report of a FDD-UL-DL are reported on a same FDD-UL, a method for performing a P-CSI report is provided according to an embodiment of the present invention.

According to RAN1 discussion, the P-CSI report is carried on a PUCCH. For an uplink subframe, it is supported by the UE that a CSI of a downlink carrier is transmitted on the uplink subframe. For the P-CSI report, the P-CSI report including the RI and CQI/PMI is configured for a single frequency band. In a R8/R9LTE system, the high layer may configure a configuration parameter ri-ConfigIndex($I_{RI}$) to determine a period MRI and an offset NOFFSET,RI for the UE to perform the RI report. Similarly, the high layer may configure a configuration parameter cqi-pmi-ConfigIndex ($I_{CQI/PMI}$) to determine a period $N_{pd}$ and an offset $N_{OFFSET,CQI}$ for the UE to perform the CQI/PMI report.

For a flexible LTE FDD system, i.e., downlink transmission can be performed on at least one of the FDD-DL and the FDD-UL-DL, report periods and report offsets of RI reports and CQI/PMI reports of two frequency bands are respectively configured on a FDD-UL. When collision occurs between the P-CSI reports of the respective two frequency bands, i.e., the P-CSI reports are mapped onto a same uplink subframe, the UE determine which frequency band is for the P-CSI report to be transmitted according to a priority rule. There are some considerations about a method for defining a priority rule. The priority rule is defined as follows in two conditions respectively that two frequency bands in a flexible FDD cell are taken as a same cell and that the two frequency bands in a flexible FDD cell are taken as two cells.

It is assumed that the two frequency bands in a flexible FDD cell are taken as the same cell to perform the P-CSI report.

The priority rule is determined according to frequency bands. For example, it is defined that a priority of the FDD-DL is higher than a priority of the FDD-UL-DL. A priority relationship may be semi-statically determined according to high layer semi-static configuration, or may be configured through a physical layer signaling, a RRC layer signaling or broadcasting information.

A priority rule is determined according to a downlink proportion or priorities of downlink services of the two frequency bands. For example, the entire downlink frequency band of a flexible FDD is used for downlink transmission. In order to ensure effectiveness of transmission on a downlink subframe of the downlink frequency band, the UE reports the CSI of the downlink subframe of the flexible FDD system on the PUSCH. For example, when the priority of a service carried on the FDD-UL-DL is higher than that on the FDD-DL subframe, the UE perform selection to report CSI of the FDD-UL-DL on the PUSCH through the A-CSI report.

A priority rule is determined according to a CSI process of CSI measurement. When multiple CSI processes are configured for the UE by the higher layers, e.g., a transmission mode TM10 is configured for the UE by the higher layers, the UE respectively measures and reports CSI of the multiple CSI processes. For example, it is defined that a priority of a 1st set of CSI process is higher than a priority of a 2nd set of CSI process When it is configured by the high layer that a CSI process of the FDD-DL is the 1st set of CSI process and a CSI process of the FDD-UL-DL is the 2nd set of CSI process, UE perform selection to perform the CSI of the FDD-DL.

For the P-CSI report, four report modes are defined in a current specification. For example, a report mode 1-0 represents there is a wide-band CQI and there is not a PMI, a report mode 1-1 represents there is a wide-band CQI of a single PMI, a report mode 2-0 represents there is a sub-band CQI and there is not a PMI, and a report mode 2-1 represents a sub-band CQI and a single PMI. For the four report modes, ten report types are defined in the specification as shown in Table 16.

TABLE 18

| Type 1 | Sub-band CQI selected by a UE |
| Type 1a | Sub-band CQI and a second category PMI |
| Type 2 | wide-band CQI and PMI |
| Type 2a | wide-band CQI and a first category PMI |
| Type 2b | wide-band CQI and a second category PMI |
| Type 2c | wide-band CQI and a first/second category PMI |
| Type 3 | RI |
| Type 4 | wide-band CQI |
| Type 5 | RI and a first category PMI |
| Type 6 | RI and PTI |

Report types supported by different report modes may be different. For example, the report mode 1-0 includes report types (3, 4), the report mode 1-1 includes report types (3, 5, 2, 2b, 2c), the report mode 2-0 includes report types (1, 3, 4), the report mode 2-1 includes report types (1, 1a, 2, 2a, 2b, 3, 6).

The priority rule is determined according to report modes configured by the high layer or priorities of report types. In a current specification, it is defined that when the UE is configured in a cell and CSI report types (3, 5, 6) of the UE in a serving cell c configured by the high layer is mapped onto a same uplink subframe with UE report types (1, 1a, 2, 2a, 2b, 2c, 4) in the serving cell c, the priority of the report types (3, 5, 6) is higher than the priority of the report types (1, 1a, 2, 2a, 2b, 2c, 4). When multiple CSI processes are configured for the UE by the high layer and CSI report types corresponding to the multiple CSI processes have a same priority, priorities of the CSI processes is compared, the CSI with a lowest CSI process index has a high priority. The priority rule is determined according to report types of the respective FDD-DL and the FDD-UL-DL configured by the high layer or priorities of CSI process indexes. For example, when the RI of the FDD-DL (the report type 3) and the wide band CQI of the FDD-UL (the report type 4) is configured to be reported by the high layer, the UE preferably perform the P-CSI report of the FDD-DL. For example, the high layer configures that a CSI process index of the CSI measurement for the FDD-DL is taken as a 1st set of the CSI processes, and a CSI process index of the CSI measurement for the FDD-UL-DL is taken as a 2nd set of the CSI processes. The UE preferably perform the 1st set of CSI process, i.e., the P-CSI report of the FDD-DL frequency. A frequency band of a flexible cell is indicated through a CSI process index.

For two P-CSI reports conflicting with each other, it is assumed that priority rules may be not distinguished through CSI processes. A priority may be directly defined according to an index of a frequency band corresponding to a CSI report. In particular, for the P-CSI reports conflicting with each other, the UE firstly performs determination according to priority of report types of P-CSI reports configured by the high layer. For a given FDD-UL subframe, in the case of collision between the P-CSI reports with report types of the same priority, the UE performs the determination according to priorities of different frequency bands in the flexible FDD cell, e.g., the priority of the FDD-DL is higher than the priority of the FDD-UL-DL.

For two P-CSI reports conflicting with each other, priorities rules may be distinguished according to CSI processes. For a given FDD-UL subframe, in the case of collision between the P-CSI reports with two frequency bands of the same priority, CSI process indexes may be compared. When multiple CSI processes are configured for the UE by the high layer and the CSI process indexes of the two frequency bands are same, priorities rules may be distinguished according to priorities of frequency bands, i.e., the priority of the FDD-DL is higher than the priority of the FDD-UL-DL. Table 19 represents a method for defining a priority rule.

TABLE 19

| First priority | Second priority | Third priority |
| --- | --- | --- |
| Report type of a P-CSI report | CSI process index | Different frequency bands in a same flexible FDD cell |

In another example, the priorities are different for different report modes. For example, a report mode 1-0 represents there is a wide-band CQI and there is not a PMI, a report mode 1-1 represents there is a wide-band CQI of a single PMI. It may be defined that a priority of the report mode 1-0 is higher than a priority of the report mode 1-1, a priority of the report mode 1-1 is higher than a priority of the report mode 2-0, a priority of the report mode 2-0 is higher than a priority of the report mode 2-1. For two P-CSI reports conflicting with each other, the UE may perform determination of the frequency band corresponding to the P-CSI report according to priorities of report modes of the P-CSI reports configured by the high layer. For a given FDD-UL subframe, in the case of collision between the P-CSI reports with PUCCH report mode of the same priority, CSI process indexes are compared. The UE performs determination according to priorities of different frequency bands of the flexible FDD cell, e.g., the priority of the FDD-DL is higher than the priority of the FDD-UL-DL. Table 20 represents a method for defining a priority rule.

TABLE 20

| First priority | Second priority | Third priority |
|---|---|---|
| Report mode of a P-CSI report | CSI process index | Different frequency bands in a same flexible FDD cell |

A priority rule may be determined by combining priority rules above. Table 21 represents a method for defining a priority rule.

TABLE 21

| First priority | Second priority | Third priority | Fourth priority |
|---|---|---|---|
| Report type of a P-CSI report | P-CSI report mode | CSI process index | Different frequency bands in a same flexible FDD cell |

For the P-CSI reports conflicting with each other, the UE performs determination according to priorities of the report types of the P-CSI reports configured by the high layer. For a given FDD-UL subframe, in the case of collision between the P-CSI reports with the report types of the same priority, priorities of the report modes configured by the high layer are compared. For a given FDD-UL subframe, in the case of collision between the P-CSI reports with the report modes of the same priority, the CSI process indexes are compared. For a given FDD-UL subframe, in the case of collision between the P-CSI reports with CSI process indexes of the same priority, the UE performs determination according to priorities of different frequency bands of the flexible cell, e.g., the priority of the FDD-DL is higher than the priority of the FDD-UL-DL.

In another example, in a current specification, it is defined that when multiple cells are configured for the UE by the high layer, collision occurs among P-CSI reports of the cells, and priorities of report types of CSI reports of different cells are same, UE performs determination according to carrier indexes. A P-CSI report of a frequency band with a less carrier index has a higher priority. When multiple cells and multiple CSI processes are configured for the UE by the high layer and priority of the report types of the CSI of the different cells are same, the CSI process indexes may be compared, the CSI process with a higher CSI process index has a higher priority. For the P-CSI reports conflicting with each other, the UE performs determination according to priorities of report types of P-CSI reports configured by the high layer. When priorities of the report types are same, the CSI process indexes are compared. When the CSI process indexes are same, the carrier indexes are compared. When the P-CSI reports conflicting with each other corresponds to a same flexible FDD cell, frequency bands are compared. According to priorities of the frequency bands, the UE performs the determination, e.g., the priority of the FDD-DL is higher than the priority of the FDD-UL-DL. Table 22 represents a method for defining a priority rule.

TABLE 22

| First priority | Second priority | Third priority | Fourth priority |
|---|---|---|---|
| Report type of a P-CSI report | CSI process index | Carrier index | Different frequency bands in a same flexible FDD cell |

Table 23 represents a method for defining a priority rule.

TABLE 23

| First priority | Second priority | Third priority | Fourth priority |
|---|---|---|---|
| Report type of a P-CSI report | CSI process index | Different frequency bands in a same flexible FDD cell | Carrier index |

In another example, for the P-CSI reports conflicting with each other, the UE performs determination according to report types of the P-CSI reports configured by the high layer. When the report types are same, the CSI process indexes are compared. When the CSI process indexes are same, the frequency bands are compared. When the frequency bands corresponding to the P-CSI reports conflicting with each other are same, carrier indexes are compared. For example, a FDD-DL index is 0, and a FDD-UL index is 1. When the frequency bands are compared, it may be defined a priority of a frequency band 0 is higher than a priority of a frequency band 1. When the frequency bands are compared and the UE works in a FDD or TDD cell according to a traditional way, an index of a used frequency band may be pre-defined, e.g., the used frequency band can be fixedly processed as a frequency band 0.

Table 24 represents a method for defining a priority rule.

TABLE 24

| First priority | Second priority | Third priority | Fourth priority |
|---|---|---|---|
| Report mode of a P-CSI report | CSI process index | Carrier index | Different frequency bands in a same flexible FDD cell |

In another example, for the P-CSI reports conflicting with each other, the UE performs determination according to report modes of the P-CSI reports configured by the high layer. When the report modes are same, the CSI process indexes are compared. When the CSI process indexes are same, the carrier indexes are compared. When the P-CSI reports conflicting with each other corresponds to a same flexible FDD cell, the frequency bands are compared. The UE performs determination according to priorities of the frequency bands. For example, the priority of the FDD-DL is higher than the priority of the FDD-UL-DL.

Table 25 represents a method for defining a priority rule.

TABLE 25

| First priority | Second priority | Third priority | Fourth priority |
|---|---|---|---|
| Report mode of a P-CSI report | CSI process index | Different frequency bands in a same flexible FDD cell | Carrier index |

Alternatively, for the P-CSI reports conflicting with each other, the UE performs determination according to report modes of the P-CSI reports configured by the high layer. When the report modes are same, the CSI process indexes are compared. When the CSI process indexes are same, the frequency bands are compared. When the frequency bands corresponding to the P-CSI reports conflicting with each other are same, the carrier indexes are compared. For example, the FDD-DL index is 0, and the FDD-UL-DL index is 1. When the frequency bands are compared and the UE works in a FDD or TDD cell according to a traditional way, an index of a used frequency band may be pre-defined, e.g., the used frequency band can be fixedly processed as a frequency band 0.

Table 26 represents a method for defining a priority rule.

TABLE 26

| First priority | Second priority | Third priority | Fourth priority | Fifth priority |
|---|---|---|---|---|
| Report type of a P-CSI report | Report mode of a P-CSI report | CSI process index | Different frequency bands in a same flexible FDD cell | Carrier index |

In another example, for the P-CSI reports conflicting with each other, the UE performs determination according to priorities of report types of the P-CSI reports configured by the high layer. When the report types of the P-CSI reports of for the two frequency bands are same, the report modes of the P-CSI reports of the two frequency bands are compared. When of the P-CSI reports of the two frequency bands are same, the CSI process indexes are compared. When the CSI process indexes are same, the frequency bands are compared. When the frequency bands corresponding to the P-CSI reports conflicting with each other are same, the carrier indexes are compared. For example, the FDD-DL index is 0, and the FDD-UL-DL index is 1. When the frequency bands are compared and the UE works in a FDD or TDD cell according to a traditional way, an index of a used frequency band may be pre-defined, e.g., the used frequency band can be fixedly processed as a frequency band 0.

Table 27 represents a method for defining a priority rule.

TABLE 27

| First priority | Second priority | Third priority | Fourth priority | Fifth priority |
|---|---|---|---|---|
| Report type of a P-CSI report | Report mode of a P-CSI report | CSI process index | Carrier index | Different frequency bands in a same flexible FDD cell |

In another example, for the P-CSI reports conflicting with each other, the UE performs determination according to priorities of report types of the P-CSI reports configured by the high layer. When the report types for the two frequency bands are same, the report modes of the P-CSI reports of the two frequency bands are compared. When the report modes for the two frequency bands are same, the CSI process indexes are compared. When the CSI process indexes are same, carrier indexes are compared. When the CSI reports conflicting with each other corresponds to a same flexible FDD cell, the frequency bands are compared. For example, the priority of the FDD-DL is higher than the priority of the FDD-UL-DL.

Table 28 represents a method for defining a priority rule.

TABLE 28

| First priority | Second priority | Third priority | Fourth priority | Fifth priority | sixth priority |
|---|---|---|---|---|---|
| Report type of a P-CSI report | Report mode of a P-CSI report | CSI process index | Carrier index | Index of a CSI subframe set | Different frequency bands in a same flexible FDD cell |

For the P-CSI reports conflicting with each other, the UE performs determination according to priorities of report types of the P-CSI reports configured by the high layer. When the report types for the two frequency bands are same, the report modes are compared. When the report modes for the two frequency bands are same, the CSI process indexes are compared. When the CSI process indexes are same, carrier indexes are compared. When the carrier indexes are same, indexes of CSI subframe sets are compared. When the CSI reports conflicting with each other corresponds to a same flexible FDD cell, the frequency bands are compared. For example, the priority of the FDD-DL is higher than the priority of the FDD-UL-DL.

Table 29 represents a method for defining a priority rule.

TABLE 29

| First priority | Second priority | Third priority | Fourth priority | Fifth priority | Sixth priority |
|---|---|---|---|---|---|
| Report type of a P-CSI report | Report mode of a P-CSI report | CSI process index | Carrier index | Different frequency bands in a same flexible FDD cell | Index of a CSI subframe set |

For P-CSI reports conflicting with each other, the UE performs determination according to priorities of report types of the P-CSI reports configured by the high layer. When the report types for the two frequency bands are same, report modes are compared. When the report modes for the two frequency bands are same, the CSI process indexes are compared. For a given FDD-UL subframe, in the case of collision between the P-CSI reports with CSI process indexes of the same priority, carrier indexes are compared. When the carrier indexes are same and the CSI reports conflicting with each other corresponds to a same flexible FDD cell, the frequency bands are compared. For example, the priority of the FDD-DL is higher than the priority of the FDD-UL-DL.

It is assumed that the two frequency bands of the flexible FDD cell are taken as two cells, and the UE works in a CA mode.

It is assumed that a flexible FDD cell is configured for the UE, and the UE may work in a CA system including two cells. The two cells herein refer to the FDD-DL of the flexible FDD cell and the FDD-UL of the flexible FDD cell. It may be defined that a cell corresponding to the FDD-DL is CC #0, e.g., Pcell, a cell corresponding to the FDD-UL is CC #1, or a carrier index corresponding to the FDD-UL is configured through the high layer signaling. It is assumed that multiple cells are configured for the UE, which includes at least one flexible FDD cell. The UE may work in a CA system including multiple cells. Each of the FDD-DL and the FDD-UL of each flexible FDD cell is processed as a cell. carrier indexes corresponding to the FDD-DL and the FDD-UL may be respectively defined through a high layer signaling, or a carrier index of a cell corresponding to the FDD-DL is configured as k through the high layers, a carrier index of a cell corresponding to the FDD-UL-DL is configured as k+1 through the high layers.

After the two frequency bands of the flexible cell are respectively processed as two cells, for the P-CSI reports conflicting with each other, priorities may be determined according to a current priority rule. The UE performs determination according to a priority of a report type of each cell configured by the high layer. When priorities of the report types of the two cells are same, the CSI process indexes are compared. When CSI process indexes are same, carrier indexes are compared. Table 30 represents a method for defining a priority rule.

TABLE 30

| First priority | Second priority | Third priority |
|---|---|---|
| Report type of a P-CSI report | CSI process index | Carrier index |

Table 31 represents another method for defining a priority rule.

TABLE 31

| First priority | Second priority | Third priority | Fourth priority |
|---|---|---|---|
| Report type of a P-CSI report | Report mode of a P-CSI report | CSI process index | Carrier index |

For the P-CSI reports conflicting with each other, a current priority rule may be still used as a priority for performing determination. For example, the high layer configures the UE to work in a CA mode, and configures multiple cells and multiple CSI processes for the UE. When collision occurs for the P-CSI reports, the UE performs the determination according to a priority of a report type of each cell configured by the high layer. When priorities of report types of the two cells are same, report modes of the P-CSI reports are compared. When the report modes of the P-CSI reports are same, the CSI process indexes are compared. When the CSI process indexes are same, carrier indexes are compared.

So far, a process of embodiment 4 finishes. In the embodiment, when collision occurs for P-CSI reports of different frequency bands configured by the high layer, the UE determines a report way of a P-CSI report according to a priority rule. When two frequency bands of a flexible FDD cell is taken as a cell and collision between P-CSI reports configured for the two frequency bands occurs, a priority rule may be determined according to a priority relationship determined through high layer semi-static configuration, a physical layer signaling or a RRC layer signaling. Alternatively, a priority rule may be determined according to a downlink proportion or a priority relation of downlink services of the two frequency bands. Alternatively, a priority rule may be determined according to priorities of report types of the two frequency bands configured by the high layer. Alternatively, a priority rule may be determined according to priorities of report modes of the two frequency bands configured by the high layer. Alternatively, a priority rule may be determined according to priorities of CSI processes of the two frequency bands configured by the high layer. Alternatively, a priority rule may be determined according to priorities of the two frequency bands in a same flexible FDD cell. When the UE is configured to work multiple cells by the high layer and two frequency bands of the flexible FDD cell are taken as a cell, a priority rule may be determined according to a priority of a carrier index, and may be further determined according to a report type of a P-CSI report, a report mode of a P-CSI report, a process index, a carrier index, an index of a CSI subframe index and combination of priorities of one or more frequency bands of the flexible FDD cell. When the two frequency bands of the flexible FDD cell are taken as two cells and collision between the P-CSI reports occurs, a method for determining a priority rule is same as that in a current prior art. For example, the priority rule may be determined according to priorities of report types of different cells configured by the high layer, or may be determined according to priorities of CSI process indexes of different cells configured by the high layers, or may be determined according to priorities carriers of different cells.

For the flexible FDD duplex mode, different uplink-downlink time slot configuration may be adopted for a FDD uplink frequency band. A method includes that uplink subframes and downlink subframes are assigned in a 10 ms period. The method is consistent with a 10 ms subframe in a current LTE system, so as to simplify related standard and reduce UE complexity. For example, a structure of the 10 ms subframe still adopts current TDD uplink-downlink time slot configurations 0-6 which limits most available uplink subframes in the frequency band. Thus, considering a condition that uplink services is a lot, the number of uplink time slots on the frequency band may be increased. For example, in the current TDD uplink-downlink configuration, additional five configurations are added, wherein the numbers of uplink subframes respectively supported by the five configurations are respectively 0, 7, 8, 9 and 10. Another method includes that it is not limited to the structure of the 10 ms radio subframe, i.e., another repeating period of the downlink subframes and the uplink subframe may be adopted. Since HARQ Round Trip Time (RTT) in a current LTE FDD system is 8 ms, in order to matching with the HARQ RTT in the LTE FDD system, in a method for assigning uplink subframes and downlink subframes of a FDD uplink frequency band, a 8 ms period may be adopted to perform assignment. The number of the uplink subframes assigned in each 8 ms period may be all or a part of a value from 0 to 8. FIG. 9 is a schematic diagram illustrating a possible uplink-downlink time slot configuration according to an embodiment of the present invention. A design rule of the configuration is that the downlink time slots or the uplink time slots are consecutively assigned as much as possible, and a transition between an uplink subframe and a downlink subframe is decreased as much as possible. In a 3GPP specification, a P-CSI report is carried in the PUCCH. In a R8/R9LTE system, the P-CSI report of the RI and the CQI/PMI is configured for a single frequency band, wherein determination is performed by configuring a configuration parameter ri-ConfigIndex($I_{RI}$) through a high layer. A configuration period MRI and an offset $N_{OFFSET,RI}$ are configured for the RI report. Determination is performed by configuring a configuration parametercqi-pmi-ConfigIndex ($I_{CQI/PMI}$) by the high layer. A configuration period $N_{pd}$ and an offset $N_{OFFSET,CQI}$ are configured for the CQI/PMI report. These parameters are configured for the UE by the high layer. The UE determines a subframe location of the CSI report by looking up a list. For the FDD system, a report period of the CQI/PMI is configured with 2/5/10/20/40/80/

160. When the UE is in a DRX mode, a supported period may be 32/64/128. For the TDD system, a supported report period of the CQI/PMI is 1/5/10/20/40/80/160. Since a part of subframes of the uplink frequency band in the FDD system is used for downlink transmission, a previous timing relationship between an uplink frequency band and a downlink frequency band is not applied. For a flexible FDD duplex mode, when the frequency band is used for downlink transmission in the FDD system, configuration of a period and an offset may be re-defined or modified.

Two embodiments about a period and an offset of a P-CSI report are described as follows.

Embodiment 5

In the embodiment, when a downlink frequency band of the FDD system adopts a 10 ms subframe structure, a method for configuring a period and an offset of a P-CSI report is provided according to embodiment of the present invention.

When a uplink-downlink configuration in an uplink frequency band of a FDD system adopts a 10 ms subframe structure, in report periods of CQI/PMI in a previous FDD system, e.g., a period that is equal to 2, or a period that is not 32/64/128 because a current subframe in the FDD uplink subframe in a certain location is a downlink subframe and the P-CSI report is not performed on the current subframe. For example, the uplink-downlink configuration of the FDD uplink frequency band is a configuration 1 in a TDD configuration. FIG. 10 is a first schematic diagram illustrating a structure of a configuration of uplink time slots and downlink time slots according to an embodiment of the present invention. When cqi-pmi-ConfigIndex($I_{CQI/PMI}$) is configured with 1 by the high layer, a corresponding period $N_{pd}$ is equal to 2, and an offset $N_{OFFSET,CQI}$ is equal to 1. A subframe to perform a CQI/PMI report satisfies:

$$(10 \times n_f + [n_s/2] - 1) \bmod 2 = 0;$$

Wherein $n_f$ is a number of a radio frame, ns is a number of a time slot of the radio frame, a number of a subframe of the radio frame is 1/3/5/7/9, a subframe 4/9 is a downlink subframe, and is not used for the CQI/PMI report. A new method for configuring a period and an offset of a P-CSI report is provided. Table 32 provides a possible configuration example. A period configuration of a periodic CQI/PMI report of a TDD structure may be adopted.

TABLE 32

| $I_{CQI/PMI}$ | Value of $N_{pd}$ | Value of $N_{OFFSER,CQI}$ |
|---|---|---|
| 0 | 1 | $I_{CQI/PMI}$ |
| 1 ≤ $I_{CQI/PMI}$ ≤ 5 | 5 | $I_{CQI/PMI}$-1 |
| 6 ≤ $I_{CQI/PMI}$ ≤ 15 | 10 | $I_{CQI/PMI}$-6 |
| 16 ≤ $I_{CQI/PMI}$ ≤ 35 | 20 | $I_{CQI/PMI}$-16 |
| 36 ≤ $I_{CQI/PMI}$ ≤ 75 | 40 | $I_{CQI/PMI}$-36 |
| 76 ≤ $I_{CQI/PMI}$ ≤ 155 | 80 | $I_{CQI/PMI}$-76 |
| 156 ≤ $I_{CQI/PMI}$ ≤ 315 | 160 | $I_{CQI/PMI}$-156 |
| 316 ≤ $I_{CQI/PMI}$ ≤ 1023 |  | Reserved |

A configuration of a period 1 applies to TDD uplink-downlink configuration {0,1,3,4,6}, all uplink subframes may be used for the CQI/PMI report.

So far, a process of the embodiment finishes. In the embodiment, when a downlink frequency band of the FDD system adopts a 10 ms subframe structure, a period configuration of a periodic CQI/PMI report of a TDD structure may be adopted.

Embodiment 6

In the embodiment, when a downlink frequency band of the FDD system adopts a 8 ms subframe structure, a method for configuring a period and an offset of a P-CSI report is provided.

When the uplink-downlink configuration in the uplink frequency band of the FDD system adopts a 8 ms subframe structure, previous report periods of CQI/PMI configured in FDD, e.g., a period that is equal 2, or a period that is not a multiple of 8, is not used to perform the CQI/PMI report. A new configuration rule may in accordance with a characteristic of a 8 ms repeating period and a detail relationship of downlink time slots and uplink time slots.

In order to ensure UE communication in a normal FDD frame structure, for the FDD uplink frequency band, a super frame includes 4 radio frames, and a radio frame includes 10 subframes. In a frame, a repeating structure with a 8 ms period is adopted. It is assumed that $n_f$ is a number of a radio subframe, i.e., a start subframe of a radio frame satisfying $n_f$ mod 4=0 is aligned with a subframe 0 of a 8 ms transition period. The high layer configures ICQI/PMI by configuring the CQI/PMI report. A subframe on which the UE performs a CSI report satisfies the following relationship:

$$(10 \times n_f + [n_s/2] - N_{OFFSET,CQI}) \bmod (N_{pd}) = 0;$$

Wherein $n_f$ is a number of the uplink subframe, ns is a number of a time slot of the uplink subframe.

Table 33 represents an example of a possible configuration method. For example, when a configuration of uplink time slots and downlink time slots of the uplink frequency band is as shown in FIG. 11, a CSI report method when the high layer configures that $I_{CQI/PMI}$ is equal to 2 is as follows.

TABLE 33

| $I_{CQI/PMI}$ | Value of $N_{pd}$ | Value of $N_{OFFSER,CQI}$ |
|---|---|---|
| 0 ≤ $I_{CQI/PMI}$ ≤ 1 | 2 | $I_{CQI/PMI}$ |
| 2 ≤ $I_{CQI/PMI}$ ≤ 5 | 4 | $I_{CQI/PMI}$-2 |
| 6 ≤ $I_{CQI/PMI}$ ≤ 13 | 8 | $I_{CQI/PMI}$-6 |
| 14 ≤ $I_{CQI/PMI}$ ≤ 29 | 16 | $I_{CQI/PMI}$-14 |
| 30 ≤ $I_{CQI/PMI}$ ≤ 61 | 32 | $I_{CQI/PMI}$-30 |
| 62 ≤ $I_{CQI/PMI}$ ≤ 125 | 64 | $I_{CQI/PMI}$-62 |
| 126 ≤ $I_{CQI/PMI}$ ≤ 253 | 128 | $I_{CQI/PMI}$-126 |
| 254 ≤ $I_{CQI/PMI}$ ≤ 1023 |  | Reserved |

Embodiment 7

In the embodiment, when a downlink frequency band of the FDD system adopts a repeating structure of a period 8 ms, a method for assigning CSI-RS resources is provided.

In a current 3GPP specification, an assignment period of the CSI-RS is a multiple of 5 ms. When downlink subframes and uplink subframes are configured based on 8 ms, it is caused that since a current subframe in a certain location is an uplink subframe, the CSI-RS is not assigned, or it is caused that the current subframe is a downlink subframe and the SRS is transmitted.

An assignment method includes defining a new assignment period, e.g., the assignment period is a multiple of 4 ms. The high layer configures a subframe location of the CSI-RS with $I_{CSI-RS}$. A subframe on which the UE performs periodic measurement for the CSI-RS is satisfied a relationship as follows:

$$(10 \times n_f + [n_s/2] - \Delta_{CSI-RS}) \bmod (T_{CSI-RS}) = 0;$$

Wherein $n_f$ is a number of an uplink frame, $n_s$ is a number of a time slot of an uplink subframe.

Table 34 represents a possible method for assigning CSI-RS resources.

TABLE 34

| Configuration of a subframe of CSI-RS $I_{CSI-RS}$ | Configuration of a period of CSI-RS $T_{CSI-RS}$ (subframes) | Configuration of a subframe offset of CSI-RS $\Delta_{CSI-RS}$ (subframes) |
|---|---|---|
| 0-3 | 4 | $I_{CSI-RS}$ |
| 4-11 | 8 | $I_{CSI-RS}$-4 |
| 12-27 | 16 | $I_{CSI-RS}$-12 |
| 28-59 | 32 | $I_{CSI-RS}$-28 |
| 60-123 | 64 | $I_{CSI-RS}$-60 |

So far, a process of the embodiment finishes. In the embodiment, when an uplink frequency band of the FDD system adopts a 8 ms repeating structure, a method for assigning CSI-RS resources based on a multiple of 4 ms is provided.

It can be clearly understood by those skilled in the art that all or a part of procedures can be realized by program instructing related hardware, wherein the program may be store a computer readable storage medium, when the program is executed, the method according to an embodiment includes one or combination of the procedures.

In addition, various modules in the apparatus according to the present invention may be integrated in to a processing module, or may be separately deployed in independent physical modules. Alternatively, two or more modules of the various modules may be integrated in to a module. The integrated module above may be implemented in a hardware manner, or may be implemented in a manner of a software function module. When the integrated module is implemented in a manner of the software function module, and is sold and used as an independent product, the integrated module can be stored in a computer readable storage medium.

The storage medium above can be a read-only memory, a disk or a CD.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for reporting channel state information (CSI) by a user equipment (UE), the method comprising:
receiving, from a base station, information on a CSI report;
determining a frequency band to measure a channel state of a first downlink frequency band and a second downlink frequency band, based on the information on the CSI report;
identifying, by the UE, the CSI based on the measurement in the determined frequency band; and
transmitting, to the base station, the identified CSI based on the information on the CSI report,
wherein the information on the CSI report includes information on at least one of the frequency band of the CSI report and a CSI process of the CSI report, and
wherein the second downlink frequency band corresponds to a frequency band in which at least one uplink subframe is changed to a downlink subframe in an uplink frequency band.

2. The method of claim 1, wherein the information on the CSI report is carried on a combination of at least one of an uplink scheduling request, a physical downlink control channel (PDCCH) message of scheduling a physical uplink sharing channel (PUSCH), a configuration message, a physical layer signaling, and a radio resource control (RRC) layer signaling, and
wherein the information on the CSI report is identified, by the UE, from the combination of the at least one of the uplink scheduling request, the PDCCH message of scheduling the PUSCH, the configuration message, the physical layer signaling, and the RRC layer signaling.

3. The method of claim 2, wherein if the information on the CSI report is carried in the uplink scheduling request, transmitting the CSI comprises one of:
performing an aperiodic CSI (A-CSI) report in a frequency band on which the uplink scheduling request is received; and
determining to perform the A-CSI report when receiving the uplink scheduling request, determining the frequency band of the CSI report according to a frequency band of a CSI report included in information on a CSI report in the uplink scheduling request, wherein the frequency band of the CSI report included in the information on the CSI report is included in an information field of a carrier indication field of the uplink scheduling request.

4. The method of claim 3, wherein the A-CSI report comprises an A-CSI report of a CSI process or an A-CSI report in a CSI subframe set of the CSI process.

5. The method of claim 2, wherein the information on the CSI report is configured through a semi-static manner by a high layer; or
wherein the frequency band of the CSI report in the information on the CSI report is configured through a semi-static manner by a high layer, is indicated through the physical layer signaling or the RRC layer signaling, or is indicated based on a proportion of downlink services of two frequency bands.

6. The method of claim 2, wherein the information on the CSI report is carried in a CSI request field of the PDCCH message.

7. The method of claim 2, wherein the frequency band of the CSI report included in the information on the CSI report is carried in a CSI request field of the PDCCH message, and
wherein the report way of the CSI report included in the information on the CSI report is an aperiodic CSI (A-CSI) report, and is carried in the uplink scheduling request or the CSI request field of the PDCCH message.

8. The method of claim 2, wherein if a report way of the CSI report is an aperiodic CSI (A-CSI) report and a collision occurs among A-CSI reports corresponding to different frequency bands, before determining the frequency band of the CSI report, a report type of the CSI report, a report mode of the CSI report, a CSI process of the CSI report, a combination of at least one in a CSI subframe set and cells, the method further comprises:
configuring a priority rule; and
determining the frequency band of the CSI report according to the information on the CSI report and the priority rule,
wherein the priority rule is configured in a static way by a high layer, and is carried in the physical layer signaling or the RRC layer signaling.

9. The method of claim 8, wherein the priority rule is based on a combination of at least one of a priority rule of the frequency band of the CSI report, a priority of a downlink service transmitted on the frequency band of the CSI report, a priority of the report type of the CSI report, a priority of the report mode of the CSI report, a priority of a CSI process index of the CSI report, a priority of a cell carrier (CC) index of the CSI report, an index of the CSI subframe set of the CSI report, and priorities of different CSI types in frequency bands of CSI reports.

10. The method of claim 9, wherein the combination comprises one of:
   the priority of the report type of the CSI report that is higher than the priority of the frequency band of the CSI report;
   the priority of the report mode of the CSI report that is higher than the priority of the frequency band of the CSI report;
   the priority of the report type of the CSI report that is higher than the priority of the CSI process of the CSI report, and the priority of the CSI process of the CSI report that is higher than the priority of the frequency band of the CSI report;
   the priority of the report type of the CSI report that is higher than the priority of the report mode of the CSI report, the priority of the report mode of the CSI report that is higher than the priority of the CSI process of the CSI report, and the priority of the CSI process of the CSI report that is higher than the priority of the frequency band of the CSI report;
   the priority of the report type of the CSI report that is higher than the priority of the CSI process of the CSI report, the priority of the CSI process of the CSI report that is higher than the priority of the carrier index of the CSI report, and the priority of the carrier index of the CSI report that is higher than the priority of the frequency band of the CSI report;
   the priority of the report type of the CSI report that is higher than the priority of the CSI process of the CSI report, the priority of the CSI process of the CSI report that is higher than the priority of the frequency band of the CSI report, and the priority of the frequency band of the CSI report that is higher than the priority of the carrier index of the CSI report;
   the priority of the report mode of the CSI report that is higher than the priority of the CSI process of the CSI report, the priority of the CSI process of the CSI report that is higher than the priority of the frequency band of the CSI report, and the priority of the frequency band of the CSI report that is higher than the priority of the carrier index of the CSI report;
   the priority of the report type of the CSI report that is higher than the priority of the report mode of the CSI report, the priority of the report mode of the CSI report that is higher than the priority of the CSI process of the CSI report, the priority of the CSI process of the CSI report that is higher than the priority of the frequency band of the CSI report, and the priority of the frequency band of the CSI report that is higher than the priority of the carrier index of the CSI report;
   the priority of the report type of the CSI report that is higher than the priority of the report mode of the CSI report, the priority of the report mode of the CSI report that is higher than the priority of the CSI process of the CSI report, the priority of the CSI process of the CSI report that is higher than the priority of the carrier index of the CSI report, and the priority of the carrier index of the CSI report that is higher than the priority of the frequency band of the CSI report;
   the priority of the report type of the CSI report that is higher than the priority of the report mode of the CSI report, the priority of the report mode of the CSI report that is higher than the priority of the CSI process of the CSI report, the priority of the CSI process of the CSI report that is higher than the priority of the carrier index of the CSI report, the priority of the carrier index of the CSI report that is higher than the priority of the index of the CSI subframe set of the CSI report, and the priority of the index of the CSI subframe set of the CSI report that is higher than the priority of the frequency band of the CSI report; and
   the priority of the report type of the CSI report that is higher than the priority of the report mode of the CSI report, the priority of the report mode of the CSI report that is higher than the priority of the CSI process of the CSI report, the priority of the CSI process of the CSI report that is higher than the priority of the carrier index of the CSI report, the priority of the carrier index of the CSI report that is higher than the priority of the frequency band of the CSI report, and the priority of the frequency band of the CSI report that is higher than the priority of the index of the CSI subframe set of the CSI report,
   wherein a priority relationship of frequency bands of the CSI reports is fixedly configured, or is configured in a semi-static way by a high layer, and
   wherein the priority relationship is indicated through the physical layer signaling, the RRC layer signaling, or is indicated based on priorities of downlink services respectively transmitted on the frequency bands of the CSI reports.

11. The method of claim 2, wherein if a report way of the CSI report is an aperiodic CSI (A-CSI) report and a conflict exists among A-CSI reports of different frequency bands of respective CSI reports, before determining the frequency band of the CSI report, a report type of the CSI report, a report mode of the CSI report, a CSI process of the CSI report, a combination of at least one in a CSI subframe set and cells, the method further comprises:
   calculating, by the UE, a relationship between a number of bits of information on a CSI report of each frequency band to be reported and an uplink capacity;
   configuring, by the UE, at least one of a priority rule and the information on the CSI report according to the relationship;
   determining, by the UE, the frequency band of the CSI report according to the relationship and the configured at least one of the priority rule and the information of the CSI report.

12. The method of claim 11, further comprising:
   when the number of the bits of the information on the CSI report of each frequency band to be reported is less than an uplink capacity and a sum of numbers of bits of various frequency bands to be reported are not more than the uplink capacity, directly determining the frequency band of the CSI report, at least one of the report type and the report mode of the CSI report, and the report way of the CSI report;
   when the number of the bits of the information on the CSI report of each frequency band to be reported is less than the uplink capacity and the sum of the numbers of the bits of the various frequency bands to be reported are more than the uplink capacity, determining the frequency band of the CSI report according to the configured priority rule, and determining a part of CSI of a frequency band of another CSI report according to remaining uplink capacity; and when the number of the bits of the information on the CSI report of each frequency band to be reported is more than the uplink capacity, determining a part of CSI of the frequency band of the CSI report according to the configured priority rule.

13. The method of claim 2, wherein if a report way of the CSI report includes a periodic CSI (P-CSI) report and a conflict exists among P-CSI reports of different frequency bands, the method further comprises configuring a priority rule, wherein the priority rule is configured in a static way, and is carried in the physical layer signaling or the RRC layer signaling.

14. The method of claim 2, further comprising:

performing, by the UE, a periodic CSI (P-CSI) report;

carrying the P-CSI report on a structure of a 10 ms Frequency Division Duplex (FDD) uplink subframe; and configuring a period and an offset of the P-CSI report, wherein an uplink frame of a Channel Quality Indicator (CQI)/Pre-coding Matrix Indicator (PMI) report in the P-CSI report satisfies:

$$(10 Sn_f + [n_s/2] - 1) \mod 2 = 0, \text{ and}$$

wherein $n_f$ is a number of the uplink frame, and $n_s$ is a number of a time slot of the uplink frame.

15. The method of claim 14, wherein the period of the CQI/PMI report is configured with 1/5/10/20/40/80/160.

16. The method of claim 2, further comprising:

performing, by the UE, a periodic CSI (P-CSI) report;

carrying the P-CSI report on a structure of an 8 ms Frequency Division Duplex (FDD) uplink subframe; and configuring a period and an offset of the P-CSI report, wherein an uplink frame of a Channel Quality Indicator (CQI)/Pre-coding Matrix Indicator (PMI) report in the P-CSI report satisfies:

$$(10 Sn_f + [n_s/2] - N_{OFFSET,CQI}) \mod (N_{pd}) = 0, \text{ and}$$

wherein $n_f$ is a number of the uplink frame, and $n_s$ is a number of a time slot of the uplink frame.

17. The method of claim 16, wherein the period of the CQI/PMI report is configured with 2/4/8/16/32/64/128.

18. The method of claim 16, further comprising configuring an assignment period of a CSI-Reference Signal (RS) with 4 ms or a multiple of 4 ms, wherein an uplink frame measured for the periodic CSI-RS by the UE satisfies:

$$(10 Sn_f + [n_s/2] - x_{CSI-RS}) \mod (T_{CSI-RS}) = 0$$

wherein $n_f$ is a number of the uplink frame, and $n_s$ is a number of a time slot of the uplink frame.

19. The method of claim 18, wherein a report period of the CSI-RS is configured with 4/8/16/32/64.

20. A method for receiving channel state information (CSI) by an evolved Node Base station (eNB), the method comprising:

identifying information on a CSI report;

transmitting, to a user equipment (UE), the information on the CSI report; and receiving, from the UE, the CSI based on the information on the CSI report, the CSI being measured, by the UE, on determined frequency band of a first downlink frequency band and a second downlink frequency band, based on the information on the CSI report, wherein the information on the CSI report includes information on at least one of a frequency band of the CSI report and a CSI process of the CSI report, and wherein the second downlink frequency band corresponds to a frequency band in which at least one uplink subframe is changed to a downlink subframe in an uplink frequency band.

21. An apparatus for reporting channel state information (CSI), the apparatus comprising:

a transceiver; and a processor coupled with the transceiver, the processor configured to:

control the transceiver to receive, from a base station, information on a CSI report, determine a frequency band to measure a channel state of a first downlink frequency band and a second downlink frequency band, based on the information on the CSI report, identify the CSI based on the measurement in the determined frequency band, and control the transceiver to transmit, to the base station, the identified CSI based on the information on the CSI report, wherein the information on the CSI report includes information on at least one of the frequency band of the CSI report and a CSI process of the CSI report, and wherein the second downlink frequency band corresponds to a frequency band in which at least one uplink subframe is changed to a downlink subframe in an uplink frequency band.

22. An apparatus for receiving channel state information (CSI), the apparatus comprising:

a transceiver; and a processor coupled with the transceiver, the processor configured to:

identify information on a CSI report, control the transceiver to transmit, to a user equipment (UE), the information on the CSI report, and control the transceiver to receive, from the UE, the CSI based on the information on the CSI report, the CSI being measured, by the UE, on a determined frequency band of a first downlink frequency band and a second downlink frequency band, based on the information on the CSI report, wherein the information on the CSI report includes information on at least one of a frequency band of the CSI report and a CSI process of the CSI report, and wherein the second downlink frequency band corresponds to a frequency band in which at least one uplink subframe is changed to a downlink subframe in an uplink frequency band.

* * * * *